US006449302B2

(12) United States Patent
Hunton

(10) Patent No.: US 6,449,302 B2
(45) Date of Patent: *Sep. 10, 2002

(54) SYSTEM AND METHOD FOR PEAK POWER REDUCTION IN SPREAD SPECTRUM COMMUNICATIONS SYSTEMS

(75) Inventor: Matthew J. Hunton, Liberty Lake, WA (US)

(73) Assignee: Powerwave Technologies, Inc., Santa Ana, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/746,167

(22) Filed: Dec. 22, 2000

Related U.S. Application Data
(60) Provisional application No. 60/198,516, filed on Apr. 19, 2000, and provisional application No. 60/212,892, filed on Jun. 20, 2000.

(51) Int. Cl.[7] .................. H04L 27/30; H04L 27/00; H61R 2/06; H04K 1/00
(52) U.S. Cl. .................. 375/130; 375/200; 375/284
(58) Field of Search .................. 375/130, 200, 375/284

(56) References Cited

U.S. PATENT DOCUMENTS

| | | | |
|---|---|---|---|
| 3,898,566 A | 8/1975 | Switzer et al. | |
| 5,228,055 A | * 7/1993 | Uchida et al. | 375/1 |
| 5,490,172 A | 2/1996 | Komara | 375/296 |
| 5,621,762 A | * 4/1997 | Miller et al. | 375/298 |
| 5,636,247 A | 6/1997 | Kamerman et al. | 375/266 |
| 5,651,028 A | 7/1997 | Harris et al. | 375/286 |
| 5,727,026 A | 3/1998 | Beukema | 375/296 |
| 5,822,360 A | * 10/1998 | Lee et al. | 375/200 |
| 6,009,090 A | * 12/1999 | Oishi et al. | 370/342 |
| 6,130,918 A | 1/2000 | Humphrey et al. | 375/295 |
| 6,032,029 A | 2/2000 | Futagi et al. | |
| 6,128,351 A | 10/2000 | Jones et al. | 375/286 |
| 6,236,864 B1 | 5/2001 | McGowan et al. | 455/522 |
| 6,294,956 B1 | 9/2001 | Ghanadan | |

OTHER PUBLICATIONS

Wireless Systems Design, Sep. 2000, "Baseband Clipping Can Lead to Improved WCDMA Signal Quality", Paul Stadnik, pp. 40–44.

* cited by examiner

*Primary Examiner*—Chi Pham
*Assistant Examiner*—Tony Al-Beshrawi
(74) *Attorney, Agent, or Firm*—Myers, Dawes & Andras LLP

(57) ABSTRACT

A system and method for signal peak reduction in a spread spectrum communication system of the type including a filter for limiting signal bandwidth of symbols transmitted from the system. A signal peak reduction unit is provided before the filter that includes a filter predictor that predicts the effect of the filter on input symbols by using filter coefficient values corresponding to the filter impulse response function. Input symbols that are predicted to cause the output signal to exceed a predetermined peak limit value are adjusted. Several examples of suitable algorithms for calculating the necessary peak reduction to be applied to the input symbols are disclosed. The peak reduction unit provides adjusted symbols to the filter for processing and communication system output.

39 Claims, 27 Drawing Sheets

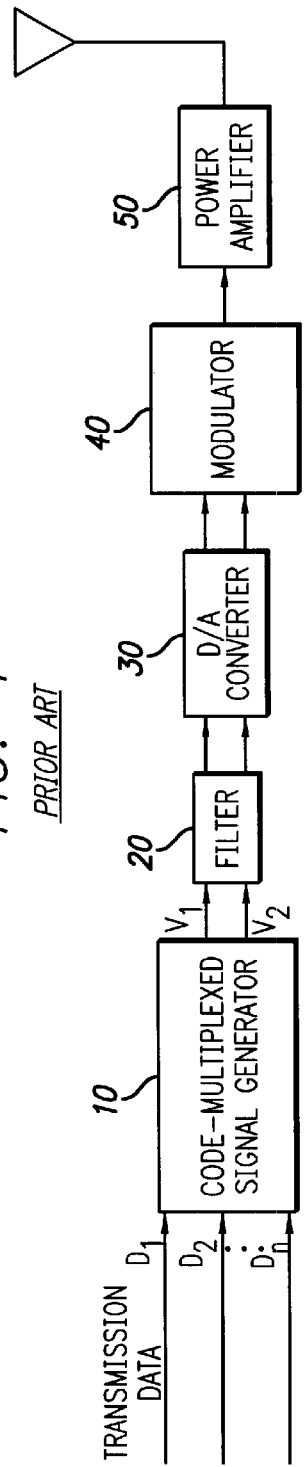
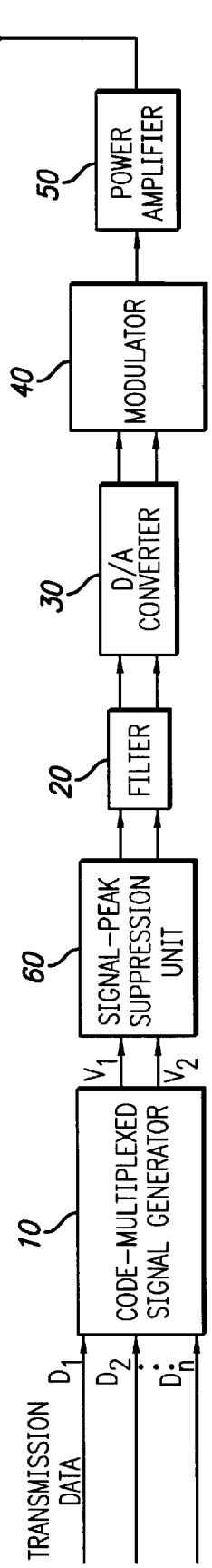

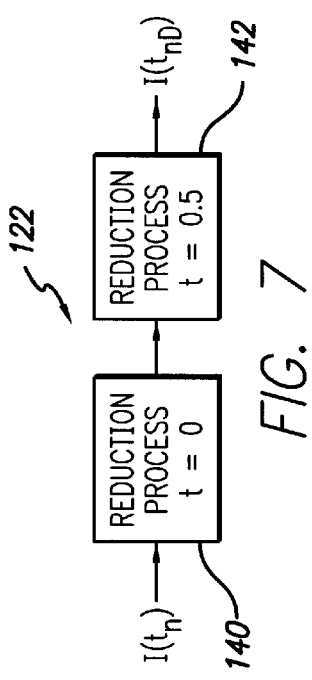
FIG. 7
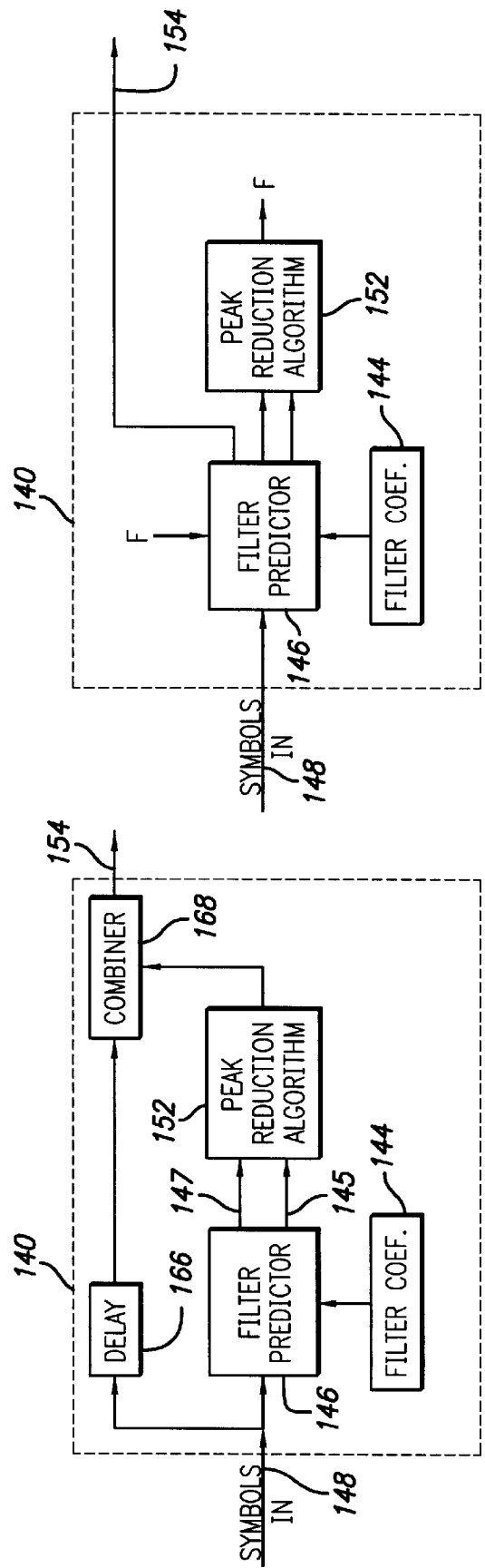
FIG. 10
FIG. 9

SYSTEM AND METHOD FOR PEAK POWER REDUCTION IN SPREAD SPECTRUM COMMUNICATIONS SYSTEMS

RELATED APPLICATION INFORMATION

The present application claims priority under 35 USC 119 (e) of provisional application serial No. 60/198,516 filed Apr. 19, 2000 and provisional application serial No. 60/212,892 filed Jun. 20, 2000, the disclosures of which are incorporated herein by reference in their entirety.

BACKGROUND OF THE INVENTION

1. Field of the Invention

The present invention relates to code division multiple access communications systems and related methods of operation. More particularly, the present invention relates to cellular communications systems and signal processing apparatus and methods employed in cellular communications systems.

2. Background of the Prior Art and Related Information

Wireless communications systems employing transmission between base stations and multiple mobile users are a key component of the modern communications infrastructure. (Such wireless communications systems, are referred to herein as "cellular" communications systems for brevity and without limiting the term cellular to the specific types of communications systems or specific frequency bands to which the term is sometimes associated.) These cellular systems are being placed under increasing performance demands which are taxing the capability of available equipment, especially cellular base station equipment. These increasing performance demands are due to both the increasing number of users within a given cellular region as well as the bandwidth requirements for a given channel. The increasing number of cellular phone users is of course readily apparent and this trend is unlikely to slow due to the convenience of cellular phones. The second consideration is largely due to the increased types of functionality provided by cellular phone systems, such as Internet access and other forms of data transfer over the cellular phone system. These considerations have resulted in a need for more channels within the available spectrum provided to cellular phone carriers as well as more bandwidth for each channel.

The traditional approach to fitting as many channels as possible into an available frequency spectrum is to place each channel in a narrow frequency band. The individual channels must be sufficiently far apart in frequency to avoid significant interference between the individual cellular system users, however. Also, the narrower the frequency band for a given channel the less bandwidth which is available for the particular channel.

An alternative approach to providing the maximum number of channels in a given frequency spectrum, which has been adopted in more and more digital cellular systems, is code division multiple access spread spectrum communication. When digital information is transmitted from one location to another the data bits are converted to data symbols before transmission. The bandwidth of the transmitted signal is a function of the number of symbols transmitted per data bit sent. In code division multiple access spread spectrum communication, more symbols are transmitted than the data bits to be sent. In particular, for each data bit to be sent a multi symbol code is transmitted. The receiver, knowing the code, decodes the transmitted signal recovering the data bits sent. With a suitable choice of unique codes, many users can communicate in the same bandwidth without interference since each channel is orthogonal through coding. In code division multiple access spread spectrum cellular systems the spreading code is typically chosen to spread the data from an individual channel across a relatively wide frequency spectrum, within of course the spectrum range available to the given cellular provider. This minimizes interference between channels and maximizes the number of channels in the available frequency spectrum. Currently, two standards exist which relate to code division multiple access cellular communications systems. These standards are commonly known as CDMA and WCDMA for Code Division Multiple Access and Wide Code Division Multiple Access. Due to the highly effective use of the available frequency spectrum CDMA and WCDMA are increasingly being adopted as the solution of choice to accommodate increased cellular use.

A problem exists, however, with the practical implementation of spread spectrum cellular systems due to the manner in which the multiple user channels are combined to create the spread spectrum signal. This may be appreciated by referring to FIG. 1 which illustrates spread spectrum signal generation in a typical prior art cellular base station implementation. As shown in FIG. 1, in a spread spectrum system, a code-multiplexed signal generator 10 receives a plurality of data channels D, e.g., n in number, corresponding to the number of users which can be accommodated. A train of symbols is created for each communication channel by multiplying the input symbols for each channel by a separate orthogonal code. The amplitude of each channel may differ based on individual channel power needs. Each symbol train is then added to create a single code multiplexed symbol train (having in-phase and quadrature components, $V_1$ and $V_2$ in FIG. 1). The code multiplexed symbol train is then passed through a filter 20 to create the desired output signal. This filter plays a critical role since it imposes a "spectral mask" over the symbol train that ensures the broadcast signals stay within the spectrum allocated to the cellular carrier. Failure to observe such limitations on spectrum allocation can violate federal regulations as well as causing noise in neighboring bands of a given carrier. The output signal is then provided to a digital to analog converter 30 resulting in an analog signal that is mixed with a carrier signal in a modulator 40. The resulting RF signal is provided to an RF power amplifier 50 and broadcast to the cellular users.

The problem begins in the combining of the multiple symbol train in the code multiplexor 10 in FIG. 1. Since many individual symbol trains are combined, the peak power of the overall signal output from the filter will depend on the individual amplitudes of the symbols being combined. It is statistically possible that the individual channel symbols will add to create very large combined symbol peaks. Although statistically not common, such very large symbol peaks must be accommodated in the overall system design. Accommodating such large symbol peaks in the overall system creates practical implementation problems. For example, the presence of potentially very large peaks in the signal being output from the filter to the digital-to-analog converter requires a very high resolution digital-to-analog converter to be used. This adds cost and complexity to the overall system.

Another problem associated with potentially very large signal peaks in a code division multiple access spread spectrum system relates to the difficulty of providing linear amplification of the signal by the RF power amplifier. In cellular systems, it is very important to provide linear amplification of the broadcast signal. This is the case since non-linear amplification of the signal can result in distortion in the signal as well as creation of spectral sidebands that can interfere with other cellular frequency bands. Since cellular frequency bands are strictly regulated, cellular systems must be carefully designed so that such creation of noise outside of the allocated frequency band is avoided. Therefore, linear RF amplification is necessary in cellular base stations. To operate an amplifier in its linear range, however, requires that the amplifier be operated in a relatively low power mode. If large random peaks in the signal are to be accommodated by such an amplifier and still keep it operating in the linear regime, a higher power RF amplifier is required. High power, high quality RF amplifiers are very expensive and this thus adds significant cost to the overall base station system.

The problem of large random peaks in the signal is therefore a significant problem in the practical implementation of spread spectrum cellular communications systems.

The significance of the problem of large random signal peaks has been appreciated in the prior art and solutions to this problem have been attempted. For example, an approach to solving this problem is described in U.S. Pat. No. 6,009,090 to Oishi, et al. The approach of the '090 patent is illustrated in FIG. 2. A signal peak suppression unit 60 is placed in the signal generation path after the code multiplexor 10 which adds the individual symbol trains together. This signal peak suppression unit compares the multiplexed symbols to a maximum permitted value and then simply truncates those symbols that exceed that maximum permitted value. Although this peak suppression unit solves the problem of large symbols, it fails to remove all the large signal peaks that must be processed by the D/A converter and power amplifier. In addition, when a symbol is truncated, a less than ideal symbol is sent, which will increase communication errors. This may be appreciated by carefully considering the effect of the signal peak suppression unit on the symbols as they continue through the signal generation path.

As illustrated in FIG. 2, after the peak suppressed symbols leave the peak suppression unit, they pass through a filter 20. The filter 20 can be represented by an impulse response function. A typical spread spectrum impulse response function is shown in FIG. 3 (WCDMA, root raised cosine, $\alpha=0.22$). The impulse response of the filter is impressed on each code multiplexed symbol as the symbols pass through the filter. This impression of the filter impulse response on the symbols can increase or decrease peaks at the on-symbol interval and can create new peaks between symbol times. More specifically, FIG. 4 shows how the filter output peaks can differ from the input symbol peaks. FIG. 4 displays the filter output caused by two consecutive input symbols of amplitude 1. The two input symbols produce the filter impulse response functions shown by the solid and dashed lines in FIG. 4 at the filter output. The true filter output would thus be the combination of these two responses (but this addition is not performed in FIG. 4 for ease of illustration).

At symbol time 0, one impulse response is at its maximum and the other is slightly negative. The signal output will therefore be lower than the input symbol amplitude at symbol time 0, for this case. (If the second symbol had been negative instead of positive the signal would have been larger than the input symbol at symbol time 0.) The output signal will reach a maximum at symbol time 0.5 (inter-symbol) when the two filter responses add to produce a combined output of about 1.2. In an actual output signal, these effects will be enhanced by the influence of the additional symbols simultaneously present in the filter.

FIGS. 5A and 5B illustrate how a given input symbol and the symbols preceding and following that symbol in the symbol train can statistically create a range of output signal values as the symbols pass through the filter. FIGS. 5A and 5B are complex vector diagrams illustrating an input symbol as a vector from the origin of the complex plane (in-phase and quadrature signal components). FIG. 5A shows the input symbol slightly exceeding a desired peak limit value (illustrated by the dashed line). In FIG. 5B, the input symbol is precisely on the limit line. The filtered output signal is a function of the input symbols and the impulse response function of the filter. As is apparent from the discussion of FIG. 4, the output signal peaks will randomly differ from the input symbol peaks since the differences are caused by the filter response to random symbols preceding and following that symbol in time. This random effect is statistically represented in the figures by the solid circle labeled "predicted filter output".

When the effect of the filter on the symbol train passing through the filter is considered, the result of the signal peak suppression unit of the above noted '090 patent is dramatically altered. For example, assuming the input symbol illustrated in FIG. 5A the '090 patent would always peak suppress this symbol as it exceeds the limit value and thus always introduce some distortion by this process. The actual value which is D/A converted and RF amplified, however, is the filtered output which statistically is represented by the circle. As may be seen, some of the time this filtered value will be inside the limit value and not require limiting. On the other hand, some of the time the filtered value will exceed the limit by more than the input symbol and will not be adequately peak adjusted even if the input symbol is truncated to the limit value. In the example of FIG. 5B in turn, the input symbol does not exceed the limit value and in the approach of the '090 patent all such symbols would pass through unaffected. As may be appreciated from the circle of filtered outputs in FIG. 5B, however, the effect of the filter is that output signals will actually exceed the limit value significantly. Therefore, for this situation the signal peak problem would not be solved by the approach of the '090 patent unit at all. Therefore not only does the approach of the above noted '090 patent introduce unnecessary distortion into the signal where peak reduction is not necessary, it also completely fails to eliminate many of the excessive peaks in the output signal, the very problem it was designed to solve.

Although not discussed in the above noted patent, an alternative approach might be to simply place the peak suppression unit on the downstream side of the filter 20 shown in FIG. 2. This also introduces a problem, however, since the presence of the peak suppression unit will inevitably distort the filter output signal. This will create spectral noise that extends beyond the spectral mask the filter was designed to maintain. As noted above, the spectral mask created by the filtering of the signal is critical in cellular systems since exceeding spectral allocations can potentially violate federal regulations.

Therefore, whether the peak suppression unit is placed before the filter or after the filter it is clear that such a solution is completely inadequate to solve the problem of large peaks in the output signal and such solution either fails to eliminate the peaks or introduces equally significant problems. Therefore, such an approach is unworkable in real world applications.

Accordingly, it will be appreciated that a need presently exists for a system and method of providing code division multiple access spread spectrum cellular transmission which avoids the above noted problem of large signal peaks and accompanying constraints and costs associated with the RF amplification and digital-to-analog conversion of such large peaks. Furthermore, it will be appreciated that a need exists for such a system and method which does not introduce significant additional new problems to the system and which can be implemented without undue cost or other complexities of implementation.

SUMMARY OF THE INVENTION

The present invention provides a system and method for reducing signal peak power in code division multiple access spread spectrum communication systems, which overcomes the above noted problems. Furthermore, the present invention provides such a system and method in a manner which does not significantly alter the spectral characteristics of the signal, which does not introduce significant undesired distortion into the signal, and which does not add significant complexity to the overall system.

In a first aspect the present invention provides a spread spectrum communication system which receives spread spectrum symbols, corresponding to a plurality of combined separate data channels, to be output by the system. The communication system includes a filter for filtering symbols before being output from the system. A peak reduction unit is provided prior to the filter, coupled between the source of the input spread spectrum symbols and the filter. The peak reduction unit receives the input spread spectrum symbols from the spread spectrum symbol source and predicts the effect of the filter on the symbols, using as an input the known filter coefficient values corresponding to the filter impulse response function. The peak reduction unit performs peak reduction processing only on those spread spectrum symbols predicted to cause the filter output to exceed a predetermined peak limit value. The peak reduction unit then provides processed symbols to the filter for filtering and output by the communication system.

The peak reduction unit preferably operates on a spread spectrum symbol stream that will be up sampled prior to filtering. Up sampling increases the symbol rate by inserting zero amplitude symbols between spread spectrum symbols without changing the time between spread spectrum symbols. By inserting these zero amplitude symbols the bandwidth of the resultant symbols is increased. This increase in symbol bandwidth creates room for both the filter passband and stopbands. The peak reduction unit preferably operates before the up sampling is performed but may operate after up sampling.

When operating before up sampling, the peak reduction unit preferably employs coefficients periodically sampled from the filter impulse response function. If for example the up sampling process adds three zero amplitude symbols between the spread spectrum symbols there will be four different periodic samplings available. The time between the samples taken is identical to the time between spread spectrum symbols. This periodic sampling of the filter impulse response is used to create a filter output predictor. Predictions will be made based on the timing of the periodic sampling taken. At a minimum these periodic samplings should be taken on the on-symbol timing and on the inter-symbol timing. The peak reduction unit would then include a first stage providing peak reduction based on the on-symbol timing and a second stage providing peak reduction based on the inter-symbol timing. Alternatively, a multi-stage implementation may be provided. Such a multi-stage implementation may employ multiple stages of peak reduction processing, each corresponding to a different periodic filter sample timing, implemented either in a series configuration or parallel configuration. Each stage of the peak reduction unit may further comprise a feedback loop that provides the peak reduction values back to the filter predictor. Also, since peak reduction is applied in a casual manner, duplicating peak power reduction stages may provide further crest factor improvement. These duplications should follow a complete set of all other periodic samplings when processed either in series or parallel.

When operating after up sampling, coefficients are taken directly from the filter impulse response function at the up sampled rate. These coefficients are then used to create a filter output predictor. Filter output predictions will then be made at the up sampled rate. From these predictions, peak reductions would be made. This approach is not preferred for certain applications and/or certain impulse response functions. When operating at the up sampled rate, peak reductions may be provided to the zero value symbols added during up sampling. Digital communication systems such as CDMA and WCDMA use transmit and receive filters designed to minimize inter-symbol interference. To maintain minimum inter-symbol interference during communication, the zero valued symbols added during up sampling must remain zero valued. Also, operating at the up sampled rate requires processing to be performed at that higher rate. Generally, the higher the processing rate, the more expensive the processing components cost. There may be applications however, where these costs are trivial and need not be considered and processing after up sampling is preferred.

More specifically, in one detailed embodiment, the spread spectrum communication system includes a peak reduction unit that includes a filter output predictor and a peak reduction calculation circuit that bases peak reduction on the filter output predictions and a predetermined filter output limit value. The peak reduction unit also preferably includes a combiner for combining the calculated peak reduction value to the spread spectrum symbol centered in the filter output predictor. The peak reduction unit therefore delays the spread spectrum symbols by one half the filter predictor length and provides peak reduction corrections on a symbol-by-symbol basis in a time-synchronized manner. The combiner may comprise a multiplier circuit and the peak reduction value a gain which when multiplied with the time-synchronized spread spectrum symbol provides a peak adjusted symbol. Alternatively, the combiner may comprise an addition circuit and the peak reduction value a vector which when added to the spread spectrum symbol provides a peak adjusted symbol.

In a further aspect, the present invention provides a system for reducing peak signal values, the system being adapted for use in a communication system including a filter which provides symbol filtering prior to outputting signals from said system. The system for reducing peak signal values comprises a filter predictor means for receiving spread spectrum symbols prior to filtering by said filter, and predicting the effect of said filtering on said symbols, and means, coupled to the filter predictor means, for reducing the peak value of spread spectrum symbols which are predicted to exceed a peak limit value after being subjected to said filtering. The filter in the communication system can be represented by a predetermined impulse response function and the filter predictor means preferably includes means for receiving filter coefficients corresponding to the impulse response function at a plurality of periodically sampled points.

In a preferred embodiment, the means for receiving filter coefficients receives filter coefficients from the filter impulse response function at least at on-symbol timing and at inter-symbol timing. Filter coefficients may also be provided at additional impulse function times which are periodically sampled from the impulse response function at the symbol rate. In addition, any or all symbol coefficient times may be repeated to account for peak reduction errors caused by the causal nature of peak reduction processing.

In a further aspect, the present invention provides a method for reducing peak signal values in a spread spectrum communication system of the type including a filter which may be represented by an impulse response function which provides symbol filtering prior to signal output from said system. The method comprises receiving spread spectrum symbols prior to filtering by said filter and predicting the effect of the filtering on the symbols. The method further comprises adjusting the value of those symbols that are predicted to cause the filter output to exceed a peak limit value.

In one preferred application of the present invention, the present invention may be implemented in a spread spectrum cellular communication system, such as a CDMA or WCDMA system. For example, the present invention may be implemented in a base station in such a spread spectrum cellular application. In such an application the problem of linear RF amplification of large peaks is avoided and RF amplifiers of reduced cost may be employed. Also, the need for expensive D/A converters is avoided. Furthermore, peak reduction is done prior to filtering which eliminates sideband generation and possible violations of spectrum allocation rules.

Further features and advantages of the present invention will be appreciated by review of the following detailed description of the invention.

BRIEF DESCRIPTION OF THE DRAWINGS

FIG. 1 is a block schematic drawing of a prior art spread spectrum communications system.

FIG. 2 is a block schematic drawing of a prior art spread spectrum communications system employing a signal peak suppression unit.

FIG. 7 is a block schematic drawing illustrating a preferred embodiment of the peak reduction unit of FIG. 6.

FIG. 9 is a block schematic drawing illustrating a prefered embodiment of a peak reduction process.

FIG. 10 is a block schematic drawing illustrating an alternate embodiment of a peak reduction process using feedback.

DETAILED DESCRIPTION OF THE INVENTION

Figure 6:
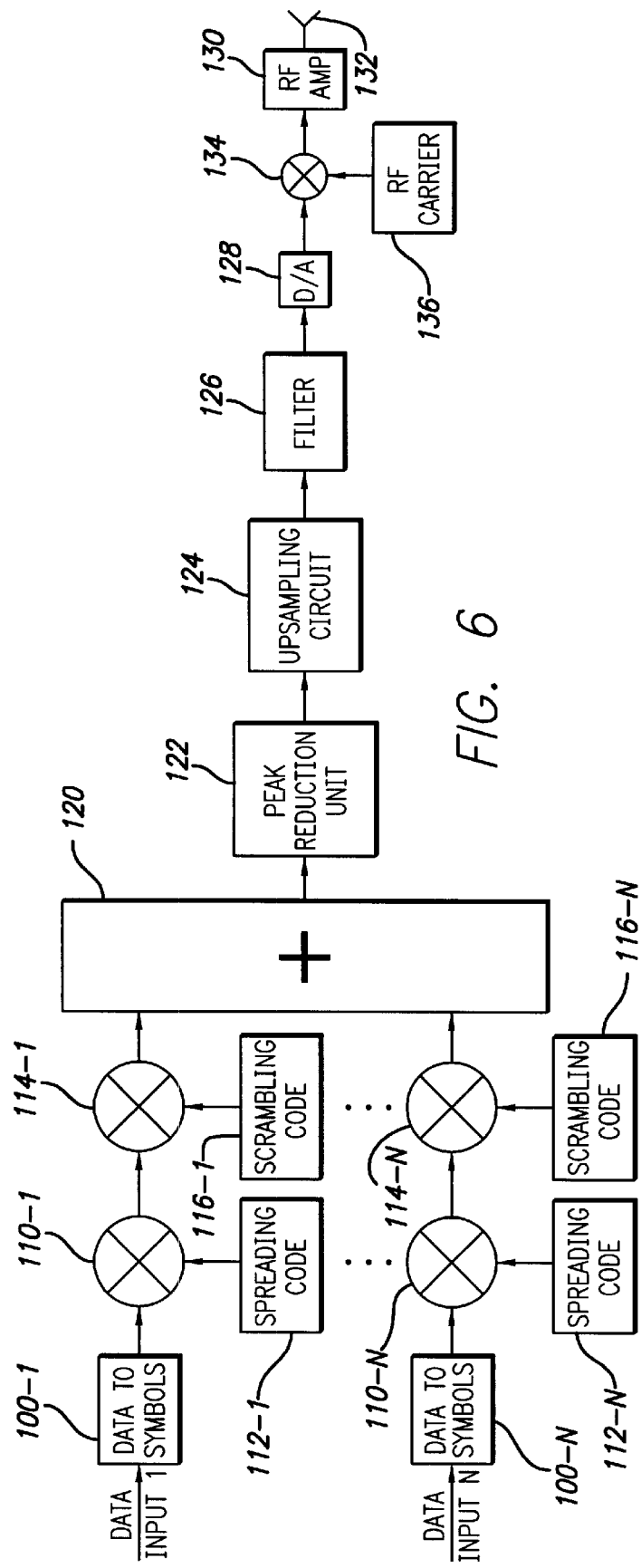
FIG. 6 is a block schematic drawing illustrating a spread spectrum communications system providing peak reduction in accordance with the present invention.

Referring to FIG. 6, a preferred embodiment of a spread spectrum communication system employing peak power reduction in accordance with the present invention is illustrated. Although the illustrated spread spectrum communication system may be implemented in a wireless cellular network, such as a WCDMA or CDMA network, and such provides one preferred application of the present invention, it should be appreciated that other applications and environments for the present invention are also possible.

As illustrated a plurality of channels, N in number, are provided as data inputs into the system. A data channel may comprise audio data, for example in a digital cellular application, or may comprise any other form of data that is desired to be transmitted over the communications system. The data in each channel then passes through a data to symbol converter 100 that provides a stream of symbols from the incoming stream of data bits. A variety of different symbol coding schemes may be used to provide the stream of symbols from the stream of incoming data bits (QPSK or, "Quadrature Phase Shift Keying", is used in WCDMA). (Implied in FIG. 6, after the data-to-symbol converter, all processing paths are complex and include both in-phase and quadrature components.) Next, the stream of symbols in each channel is provided to a mixer 110 which mixes the incoming symbol stream in each channel with a spreading code provided from a spreading code circuit 112. For example, in spread spectrum cellular communications systems a Walsh code can be employed. Each channel receives a unique orthogonal spreading code which allows the individual channels to be recovered at the receiver end by using a matching despreading code. After being combined with a unique spreading code each channel again may be provided to another mixer 114 which combines the signal in each channel with a scrambling code from scrambling code circuit 116. The scrambling code is used in cellular applications for cell site identification. A scrambling code is typically employed in cellular communications systems, but may be dispensed with in other applications. The output of each channel is then provided to the summing circuit 120 which combines the symbol streams from each of the individual channels and combines them into a single output symbol stream (for each of the two complex quadrature phases).

Since the N channels are combined together in the summing circuit 120, the potential of creating very large symbol peaks is presented as discussed above in the Background section. The present invention provides a peak reduction unit 122 that reduces or eliminates signal peaks output from the filter 126 that will exceed a given maximum signal peak power level chosen for the particular application of the communications system. As further illustrated in FIG. 6, the output of the peak reduction unit 122 is provided to an up-sampling circuit 124 which converts the symbol rate to a frequency which meets or exceeds the bandwidth requirements for the frequency range of interest. Typically the up-sampling process will simply insert zeroes into the symbol stream to allow the signal stream to operate at the desired higher clock rate to meet or exceed the bandwidth requirements. Therefore, M zeroes will be inserted into the symbol stream, for each incoming symbol, where M is an integer chosen to provide the desired up conversion. Typically the integer M will be at least 1 or greater. The up-sampled signal stream is then provided to a filter 126. In some cases the operation of the up sampling circuit 124 may be incorporated in the operation of the filter 126 rather than in a separate circuit. The filter output is provided to a digital to analog converter 128 that provides an analog signal. This analog signal will be made up of in phase and quadrature components which are not shown to this detail. This analog signal is mixed at mixer 134 with an RF carrier from RF source 136, which RF modulated signal is then provided to an RF amplifier 130 and then to an RF transmitter 132, e.g., in a wireless cellular communications base station application. The mixer 134 in this application is in actuality a quadrature up converting mixer not shown to this detail. As is well known to those skilled in the art the signal output from the filter can optionally be converted from an in-phase and quadrature signal to a real signal offset from the baseband center frequency of zero Hz. If this is done, the D/A converter can be used to create a real intermediate frequency output that can then be mixed to an RF frequency with a simple standard mixer.

As discussed above in the Background section, the filtering operation provided by filter 126 is of critical importance in many applications employing spread spectrum communications. In particular, in cellular communications systems such filtering is critical due to the necessity to maintain the transmitted signal within a prescribed frequency band. Also, the filter 126 will have a significant effect on the signal peaks produced by the symbol stream and therefore can dramatically impact any peak reduction performed prior to such filtering.

The peak reduction unit 122 avoids this problem by predicting the filter output 126 based on the symbol stream input and then performing a peak reduction processing on the symbols based on the predicted signal peak after the filtering. This filter prediction operation of the peak reduction unit 122 may be very accurately implemented since the impulse response function of the filter 126 is known in advance. Therefore, the effect of the filter on any given stream of symbols can be precisely predicted to any desired degree of accuracy by a circuit which has a desired number of filter coefficients as inputs to the circuit to adequately model the filter impulse response function. These filter coefficients are impressed on the incoming symbol stream to simulate the effect of the filter on the incoming symbol stream to create a predicted filtered output stream. The predicted filtered output stream is then subjected to a peak reduction calculation which determines whether the predicted filter output stream will exceed a signal peak limit value and if so what correction is needed. If the limit value is exceeded the actual symbol stream is then subjected to a peak reduction processing which reduces the resultant signal peak to the desired limit value on a symbol-by-symbol basis.

In this way, only required peak reduction is performed and minimal distortion is introduced into the signal. Both the accuracy of the peak reduction processing as well as the accuracy of the filter prediction process may be chosen based on the speed and complexity of the peak reduction circuitry and associated trade-offs in cost. In most applications, however, filter prediction processing as well as the peak reduction processing may be adequately implemented without adding significant complexities or costs to the overall system.

Figure 8:
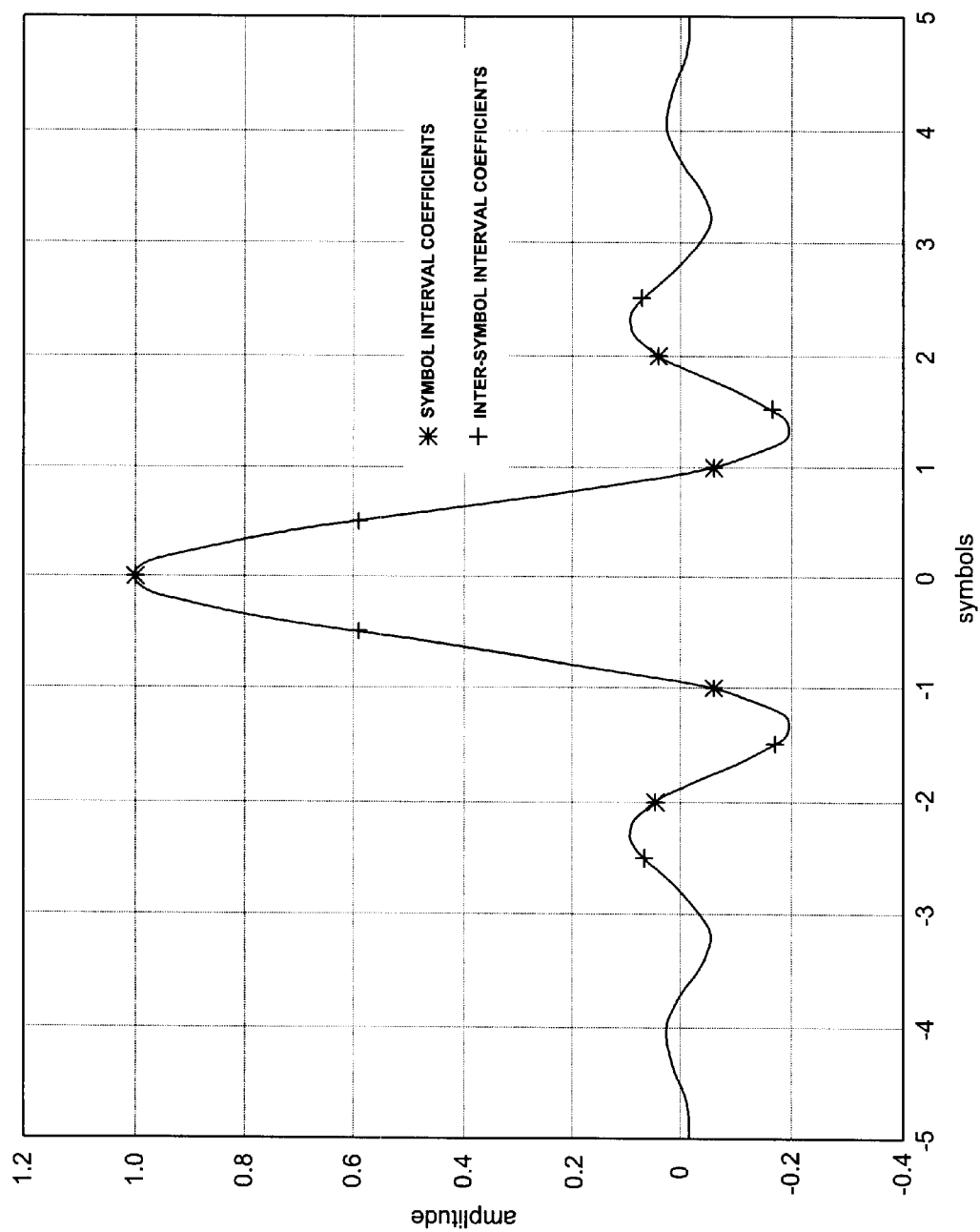
FIG. 8 is a drawing of a filter impulse response function showing filter coefficients at the on-symbol interval and inter-symbol interval.

Referring to FIGS. 7 and 8 a preferred embodiment of the peak reduction unit 122 is illustrated. More specifically, a block schematic drawing of the peak reduction unit 122 is illustrated in FIG. 7 and the impulse response function for a typical filter, illustrating typical filter coefficients employed in the peak reduction circuit 122, is illustrated in FIG. 8. As shown, the peak reduction unit 122 preferably includes two stages 140,142 corresponding to peak reduction at the on-symbol interval, t=0, and inter-symbol interval, t=0.5, respectively. The order of these two stages is arbitrary. As discussed above in relation to FIG. 6, the symbol stream is typically up sampled before passing through the filter 126.

Therefore, additional sample points will be added in between the actual symbols in the symbol train and the filter impulse response function will be impressed on these added sample points as well as the symbol sample points. Assuming an up sampling of one added sample point for each symbol in the symbol stream the impulse response function of the filter will be impressed on the up sampled symbol stream at both the on-symbol interval and the half way position between symbols, i.e., the inter-symbol interval. This is illustrated in FIG. 8 where filter coefficients at the on-symbol interval are illustrated by asterisks, and the filter coefficients at the inter-symbol interval are illustrated by crosses. Since the effect of both the symbol and inter-symbol filter coefficients will be impressed on the symbol stream as it emerges from the filter 126, to accurately predict the effect of the filter in the peak reduction unit it is necessary to take into account both filter coefficients at the on-symbol interval and at the inter-symbol interval. The illustrated two-stage process of FIG. 7 allows this on-symbol and inter-symbol processing to be performed in series. This series implementation may use less hardware, or a less complex DSP program, than if the on-symbol and inter-symbol processing are done concurrently, i.e., in parallel. Nonetheless, it should be appreciated that in an alternate embodiment such a simultaneous processing could be done and such an embodiment is described below. Also, in the case of an up sampled symbol stream having more than one added symbol for each symbol in the symbol train, additional filter timing points may be added for the filter prediction processing. Also, it should be appreciated that it may be possible to provide only on-symbol (or inter-symbol) peak reduction processing and still achieve some beneficial results, although at least on-symbol and inter-symbol processing is presently preferred. In addition, any or all stages may be repeated to account for peak reduction errors caused by the causal nature of peak reduction processing.

Although FIG. 6 shows the peak reduction unit before up sampling circuit 124, it may also be configured after the up sampling circuit (but before the filter 126). When operating after up sampling, coefficients are taken directly from the filter impulse response function at the up sampled rate. These coefficients are then used to create a filter output predictor. Filter output predictions will then be made at the up sampled rate. From these predictions, peak reductions would be made. This approach is not preferred for certain applications and/or certain impulse response functions. When operating at the up sampled rate, peak reductions may be provided to the zero value symbols added during up sampling. Digital communication systems such as CDMA and WCDMA use transmit and receive filters designed to minimize inter-symbol interference. To maintain minimum inter-symbol interference during communication, the zero valued symbols added during up sampling must remain zero valued. Also, operating at the up sampled rate requires processing to be performed at that higher rate. Generally, the higher the processing rate, the more expensive the processing components cost. There may be applications however, where these costs are trivial and need not be considered and processing after up sampling is preferred. Any modifications necessary for the below described specific embodiments to implement the peak reduction unit after up sampling will be apparent to those skilled in the art and are implied herein.

Both stages of FIG. 7 can use the reduction process shown in FIG. 9. Referring to FIG. 9, the reduction process includes a source 144 of the filter coefficients. These filter coefficients are taken from the filter impulse response function at either the on-symbol or inter-symbol interval depending on the processing stage 140 or 142 of FIG. 7. The source of these coefficients may take the form of a memory 144 storing the filter coefficients, e.g., the coefficients illustrated in FIG. 8 for the appropriate symbol interval. Of course, other filter implementations may have differing filter response functions and therefore different filter coefficients will be stored in the filter coefficients memory 144. These filter coefficients are provided to a filter predictor 146, which receives the incoming symbol stream provided along line 148 and simulates the effect of filter 126 on the symbol stream at the chosen symbol interval. Two outputs are provided from the filter predictor. One output 147 is a filter coefficient weighted sum using all input filter coefficients and an equal number of time differentiated input symbols. The other output 145 is a filter coefficient weighted sum where only the center filter coefficients and matching centered symbols are used. When an odd number of filter coefficients are used, the second output is the center coefficient and the matching center symbol used to calculate the first output 147. When an even number of coefficients are used, the two center coefficients will have the same value and may be used along with both matching center symbols used to calculate the first output 147. Each time a new symbol enters the filter predictor both outputs are generated by 146. Each new output pair is provided on a symbol-by-symbol basis, to a peak reduction algorithm processing circuit 152. The peak reduction algorithm processing circuit 152 compares the magnitude of the first predicted filter output 147 to a predetermined maximum allowable peak limit value L. If the first predicted filter output 147 exceeds the limit value then the peak reduction algorithm circuit 152 calculates an adjustment to the second filter predictor output 145 which will result in a filter output which will remain within the peak limit value after processing by filter 126 of FIG. 6. This adjustment is then applied to the corresponding symbols, delayed by delay circuit 166, on a symbol-by-symbol basis by combiner 168. The peak adjusted symbol stream is then output along line 154. A variety of different algorithms may be employed in the peak reduction algorithm circuit 152. The specific algorithm chosen may be based on the desired degree of accuracy and the available processing speed and/or complexity of hardware desired for the specific application. For example, in many applications an approximate algorithm may be perfectly acceptable and give the desired peak reduction in the symbol train An alternate embodiment of FIG. 9 is shown in FIG. 10 where the filter predictor 146, the delay 166, and the combiner 168 of FIG. 9 are incorporated as part of the filter predictor. Adjustments provided by the peak reduction algorithm 152 are then fed back (feed back values F) into the filter predictor to incorporate present adjustments on future predictions. This incorporation will be discussed in greater detail when filter predictor embodiments are discussed.

Figure 11:
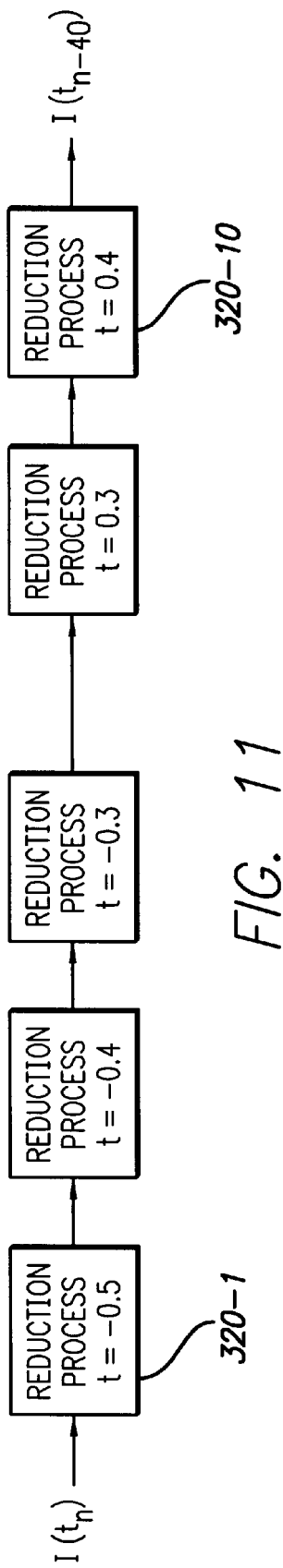
FIG. 11 is a block schematic drawing illustrating a multi-stage peak reduction unit, in accordance with an alternate embodiment of the present invention.
Figure 12:
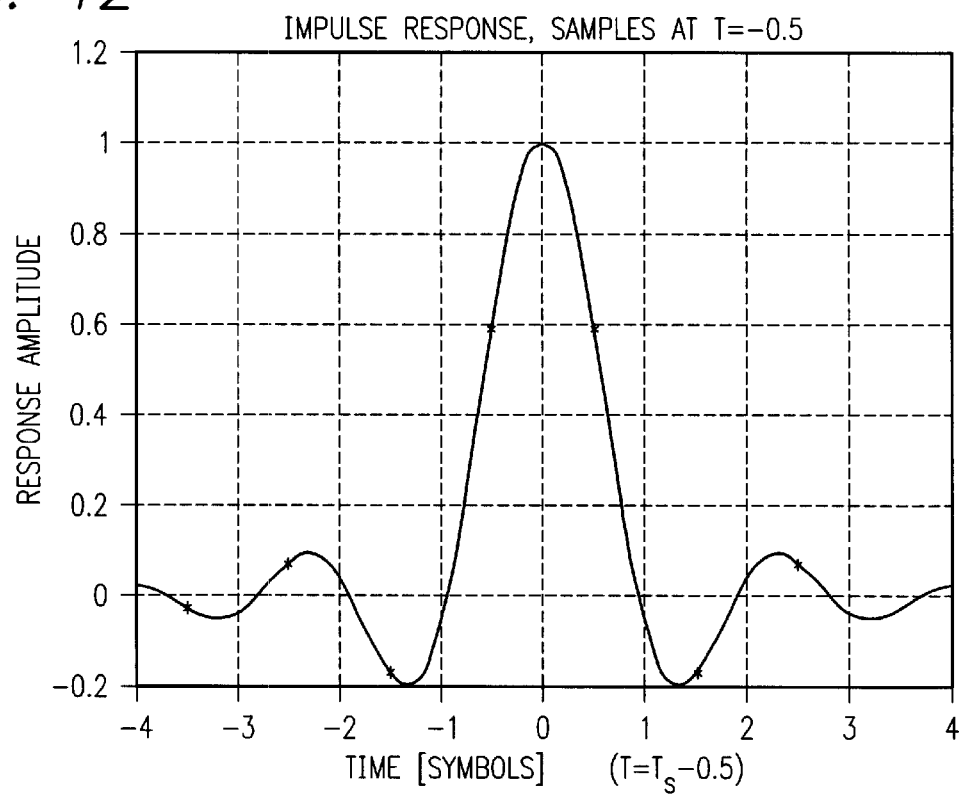
FIGS. 12–21 are drawings of a filter impulse response function showing filter coefficients at a plurality of different periodic timings, which filter coefficients may be employed with the multi-stage peak reduction unit of FIG. 11, in accordance with the present invention.

Referring to FIG. 11, an alternate embodiment of the peak reduction unit 122 (of FIG. 6) is illustrated. The implementation of FIG. 11 provides a multi-stage peak reduction unit with the series arrangement of the multiple stages.

Figure 13:
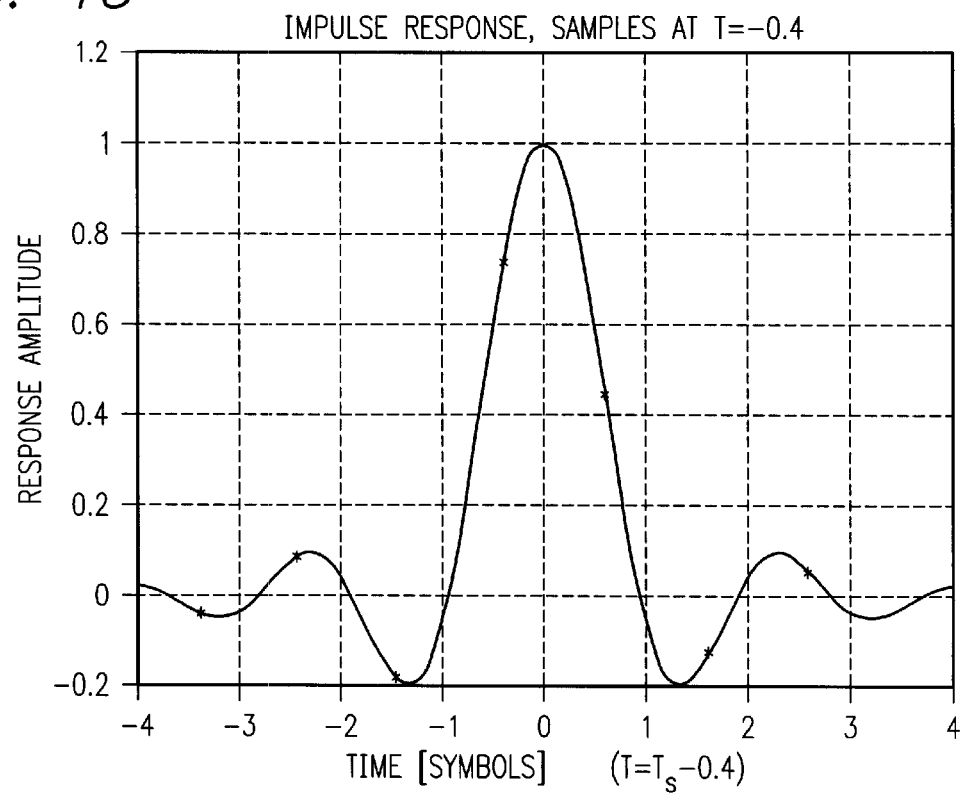
Figure 14:
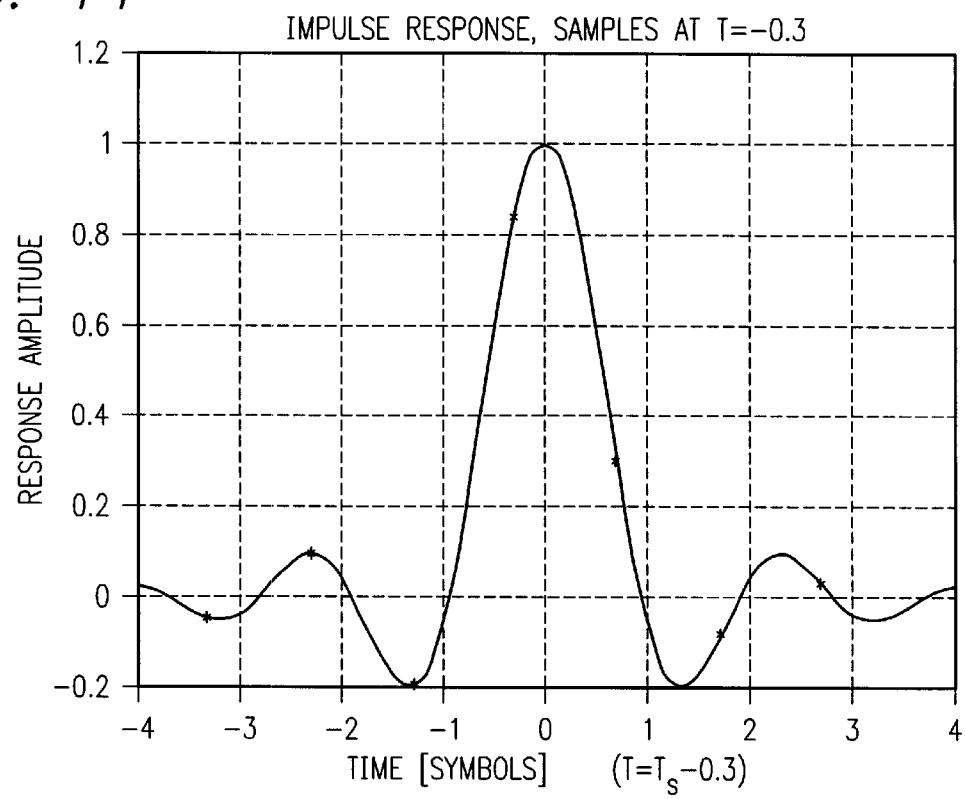
Figure 15:
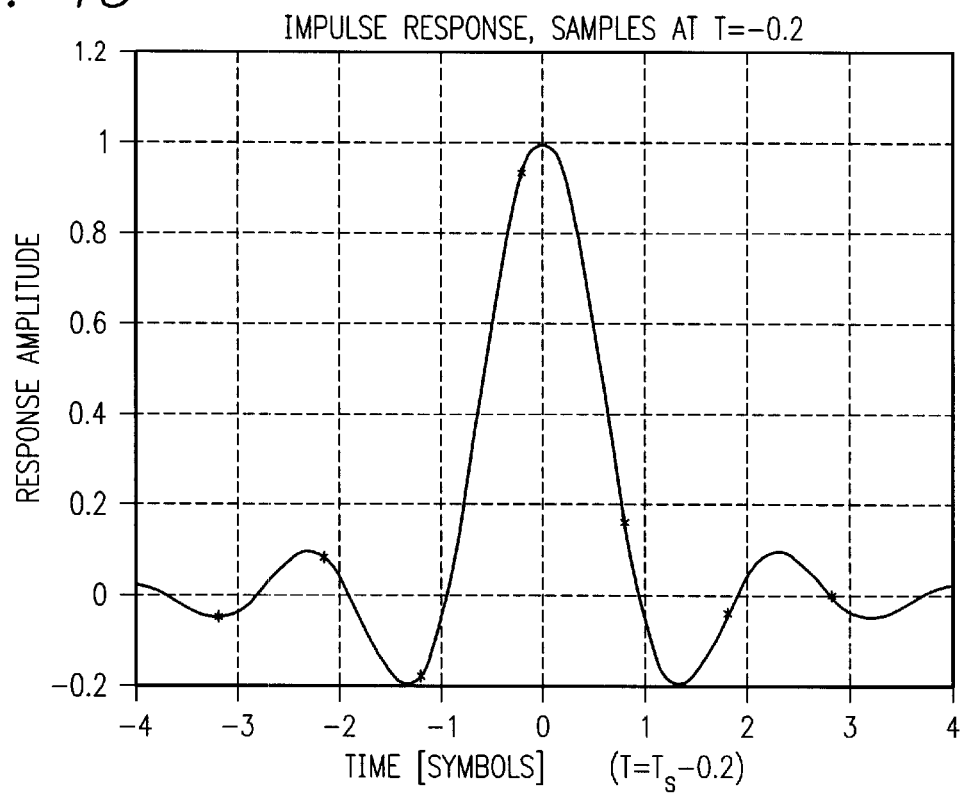
Figure 16:
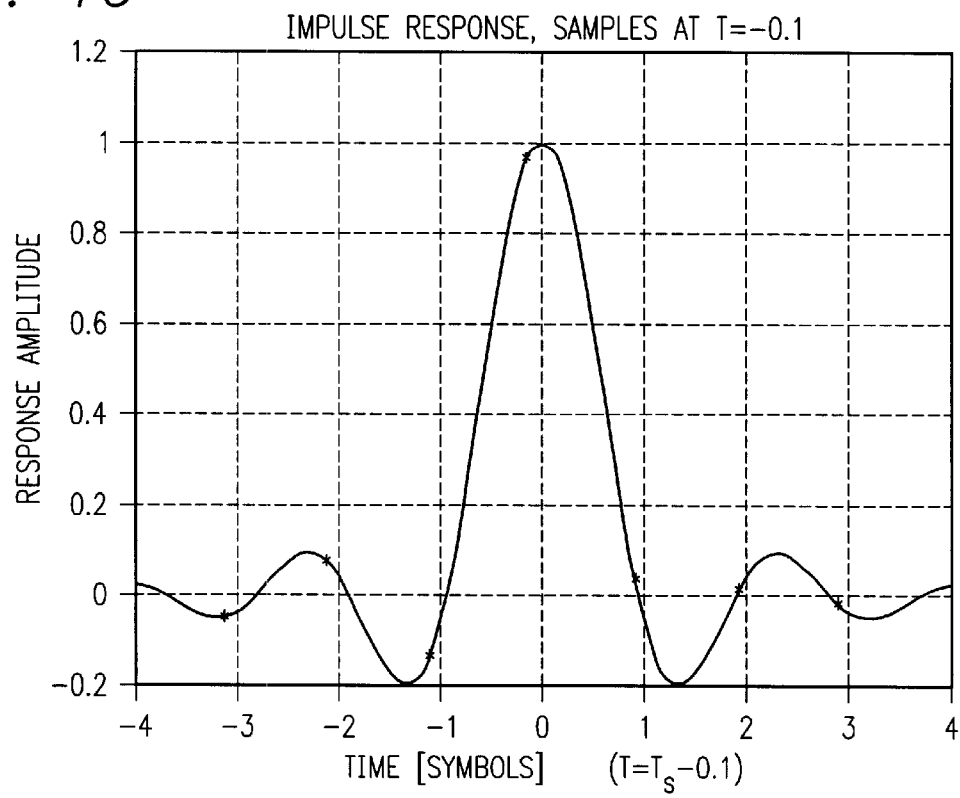
Figure 17:
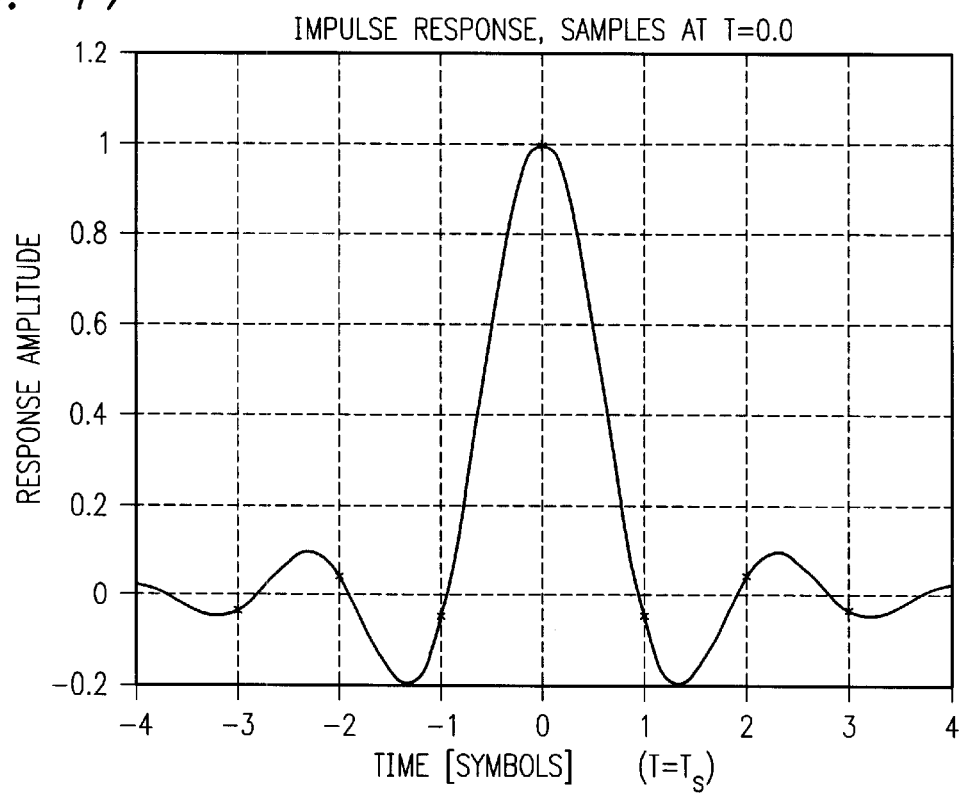
Figure 18:
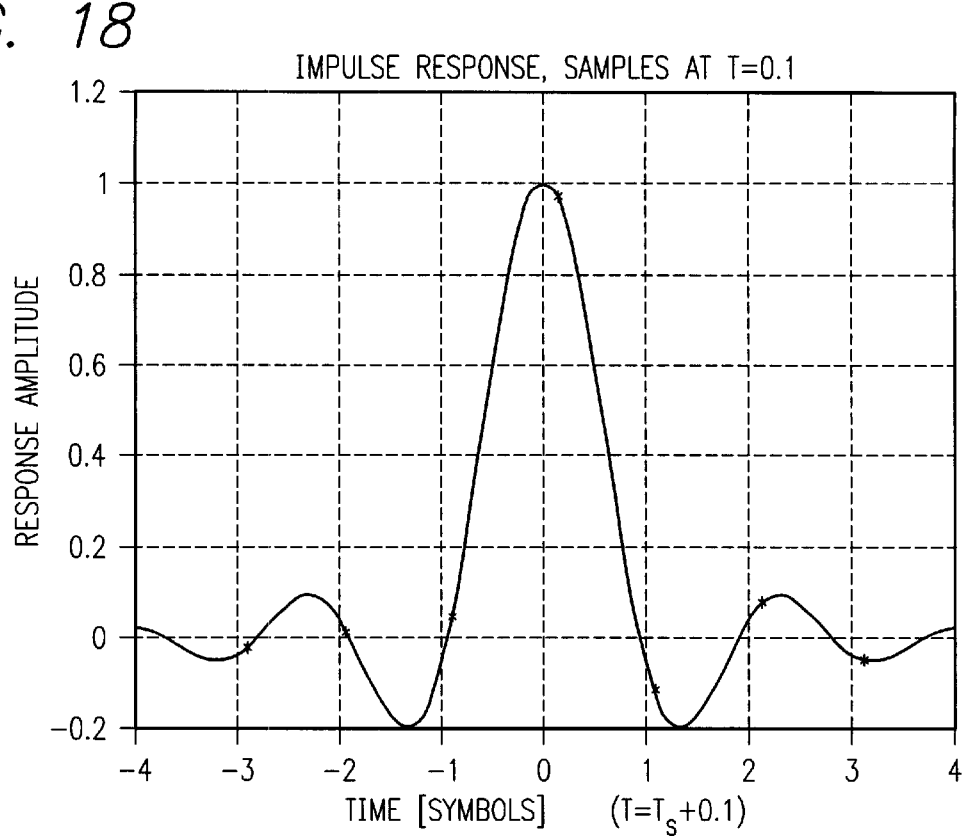
Figure 19:
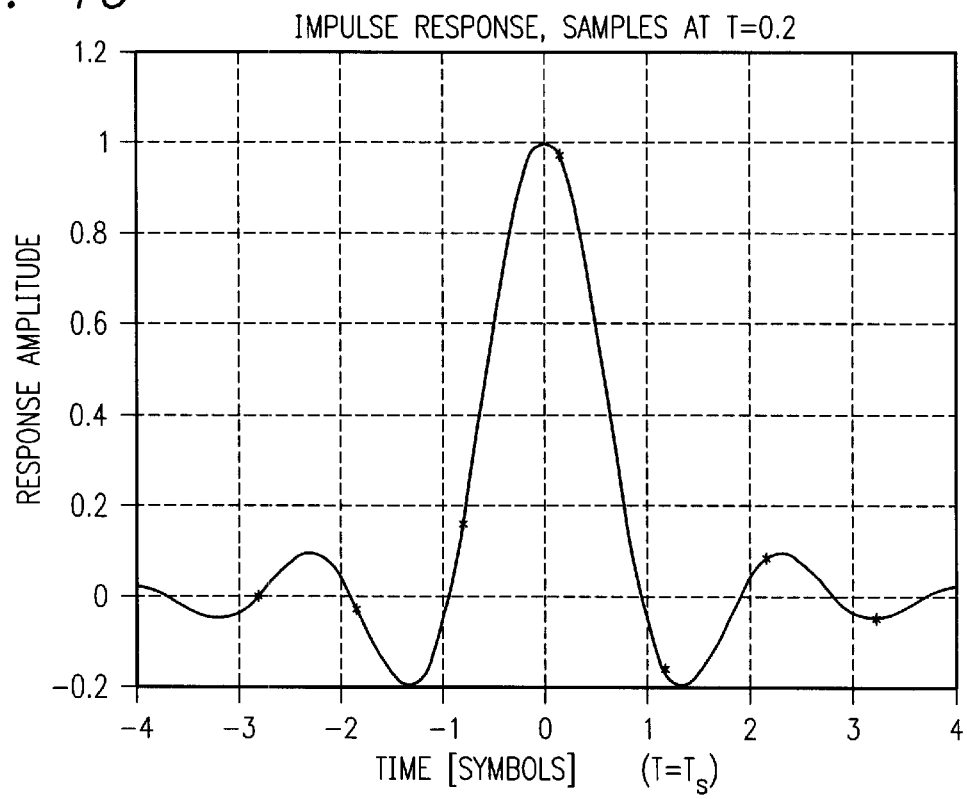
Figure 20:
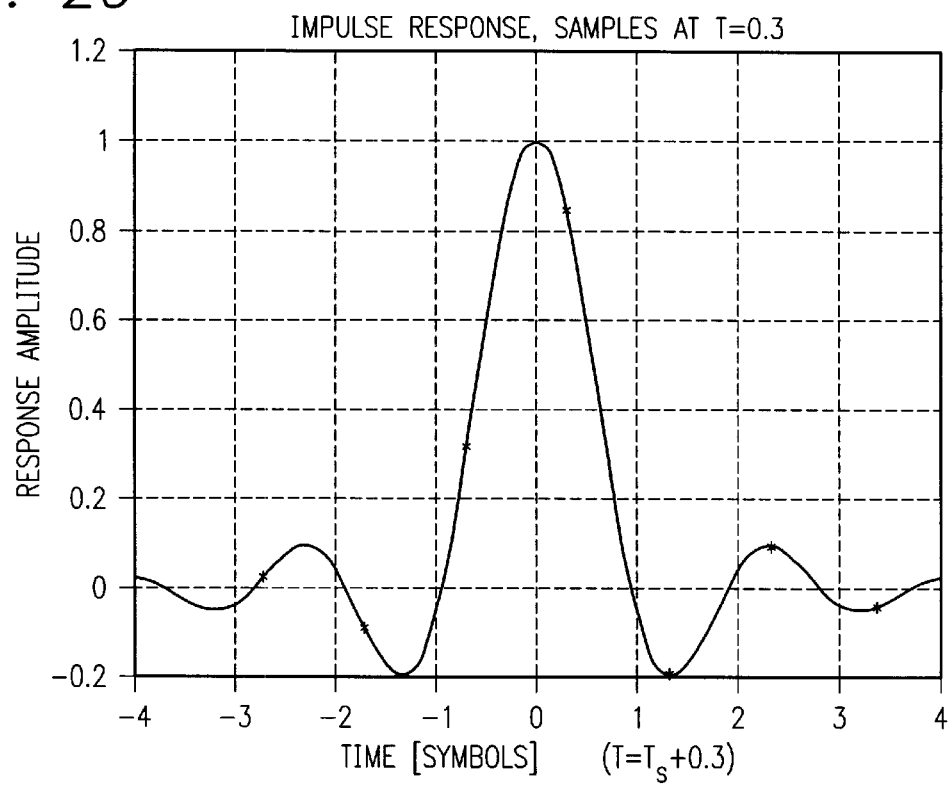
Figure 21:
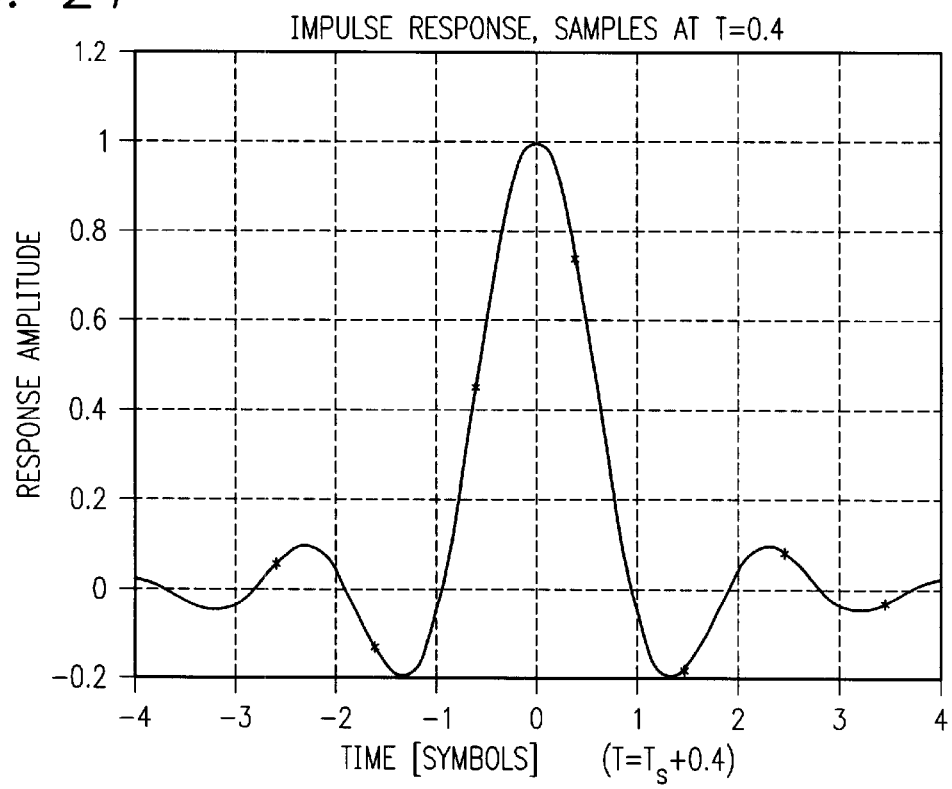

More specifically, referring to FIG. 11 the illustrated peak reduction unit includes a plurality of individual stages 320. Each stage 320 in the peak reduction unit applies a filter prediction operation using a set of periodically sampled filter coefficients corresponding to a particular filter output timing. For example, if the up sampling inserts 9 zeros between symbols then the actual filter operation which occurs will include 10 filter timing points for each symbol interval. To provide a perfectly accurate model of the filter operation each of these filter timing points would need to be included in peak reduction processing. Thus, the filter impulse response function would need to be sampled at 10 different locations for each symbol interval. This example of 10 filter coefficient sampling positions for each symbol interval is illustrated for a specific impulse response function in FIGS. 12–21. Each of these 10 figures illustrates different filter coefficient sample timing within symbol interval. In particular, FIG. 12 indicates a sampling of the impulse response function periodically at the symbol interval starting at a timing of −0.5 from the on-symbol interval, i.e., the halfway point between two symbols offset in the negative time direction (inter-symbol). FIG. 13 illustrates the impulse response function sampled periodically at the symbol interval starting from a timing of −0.4. FIGS. 14–21 in turn illustrate consecutive sample timing offsets from −0.3–+0.4. FIGS. 12–21 thus cumulatively represent 10 filter coefficient sample locations symmetrically about the on-symbol interval. Each stage 320 of the peak reduction unit of FIG. 11 implements a filter prediction operation at an individual sample timing point. Therefore, for the specific impulse response function and sampling illustrated in FIGS. 12–21, ten separate filter stages 320 would be provided each providing the filter prediction operation at one timing point corresponding to one of FIGS. 12–21. Specifically, stage 320-1 may correspond to the sample timing illustrated in FIG. 12, stage 320-2 to the sample timing illustrated in FIG. 13, etc.

It will of course be appreciated that the example of 10 sample points and 10 stages in FIG. 11 and FIGS. 12–21 is purely illustrative and a greater or lesser number of sample points and stages may be provided. Also, the number of stages 320 need not correspond to the specific amount of up sampling occurring and fewer stages and coefficient sample points may be employed than the actual amount of up sampling points. Also, FIG. 11 shows each peak reduction process arranged in time order from t=−0.5 to t=0.4. The time relationship of the peak reduction stages in FIG. 11 can be in any arbitrary order. In addition, any or all stages may be repeated to account for peak reduction errors caused by the causal nature of peak reduction processing.

Figure 22:
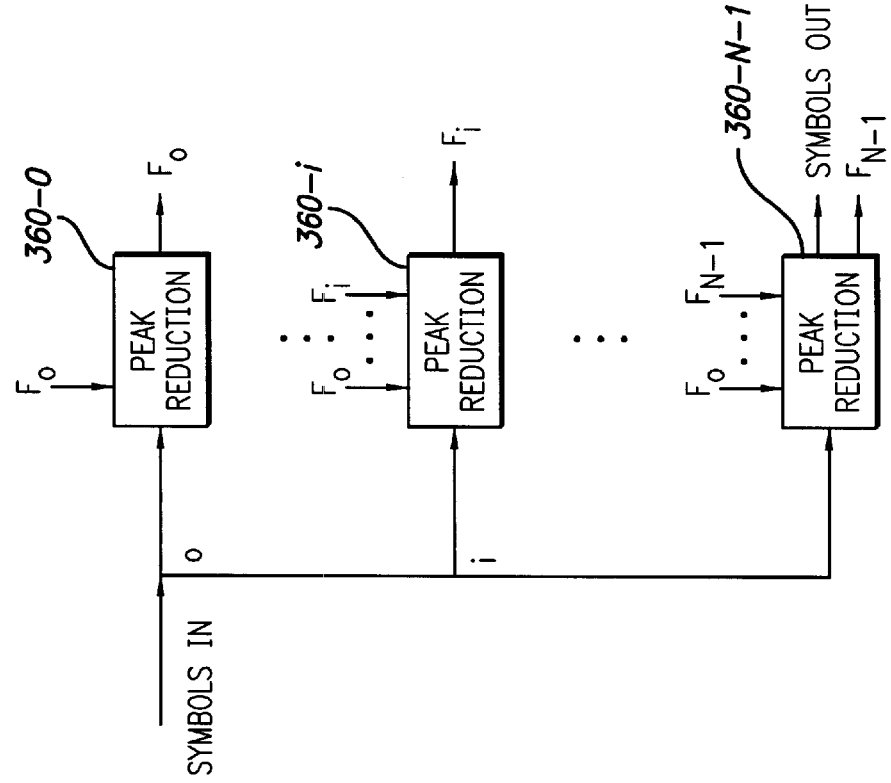
FIG. 22 is a block schematic drawing illustrating a multi-stage peak reduction unit employing a parallel implementation of the peak reduction stages, in accordance with the present invention.

Referring to FIG. 22, an alternate embodiment of the peak reduction unit is illustrated which includes a multi-stage peak reduction processing implemented in a parallel manner. The embodiment of the peak reduction unit described above in relation to FIG. 11 implemented a multi-stage peak reduction process in a series manner. In the embodiment illustrated in FIG. 22, a similar multi-stage peak reduction process is implemented in parallel. That is, each stage 360 illustrated in FIG. 22 implements a peak production processing based on different timings of the filter coefficients of the filter impulse response function corresponding to a higher rate filtering occurring after up sampling of the input symbols. For example, each stage 360 illustrated in FIG. 22 may perform a peak reduction processing employing filter coefficients sampled at the different timings shown in FIGS. 12–21. As in the case of the embodiment of FIG. 11, however, different timings and different specific filter impulse response functions may be employed and the specific filter coefficients and coefficient sample timings of FIGS. 12–21 are purely illustrative. In addition, any or all symbol coefficient timings may be repeated to account for peak reduction errors caused by the causal nature of peak reduction processing.

In the embodiment of FIG. 11 described previously, each subsequent stage in the multi-stage peak reduction unit receives as an input thereto the already peak adjusted symbols from the preceding stage. Therefore, unnecessary duplication of peak adjustment to symbols previously adjusted is avoided by this series implementation. In the parallel implementation of FIG. 22, preferably a multi-stage feedback approach is employed which feeds back peak reduction values (feed back values $F_i$) from the parallel peak reduction stages into the other stages to achieve a similar result. More specifically, the peak reduction process of the top branch, branch O, of FIG. 22 receives feedback from its own internal peak reduction algorithm and also provides this feedback to all lower branches. Lower branches, like branch i, receives feedback from its own internal peak reduction algorithm and feedback from all branches above it. The last branch, branch N-1, receives feedback from all branches including its own internal peak reduction algorithm. The bottom stage outputs the fully peak adjusted symbol stream as illustrated in FIG. 22.

Figure 23:
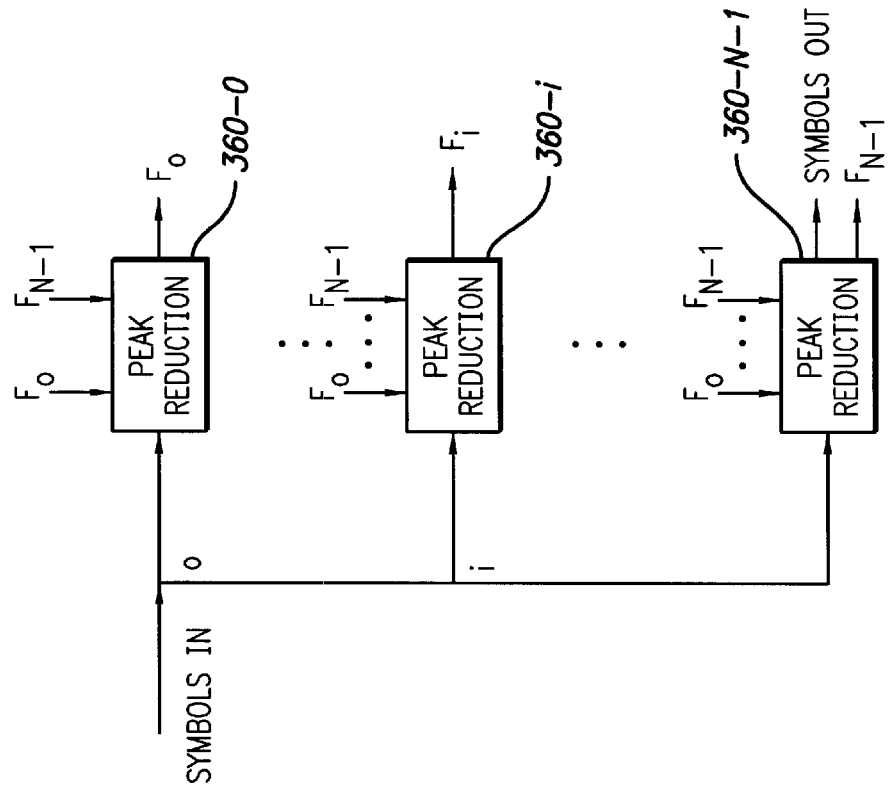
FIG. 23 is a block schematic drawing illustrating an alternate multi-stage peak reduction unit employing a parallel implementation of the peak reduction stages, in accordance with the present invention.

Referring to FIG. 23, an alternate to the parallel processing embodiment is shown. This embodiment is identical to that of FIG. 22 except feedback from all branches is provided to the peak reduction units of each branch. This alternate embodiment improves peak reduction calculations from each branch since each calculation will be based on the most currently adjusted symbols.

Since the peak reduction processing is done in parallel in the embodiments of FIGS. 22 and 23 it may be done faster than the series implementation described previously. Therefore the implementation of FIGS. 22 and 23 may be preferred in some situations. Also, since the processing can be done faster it may be possible to perform filter predictions at more coefficient timings and/or using more coefficients thereby increasing the accuracy of the peak reduction processing using the parallel implementation of FIG. 22.

Figure 24:
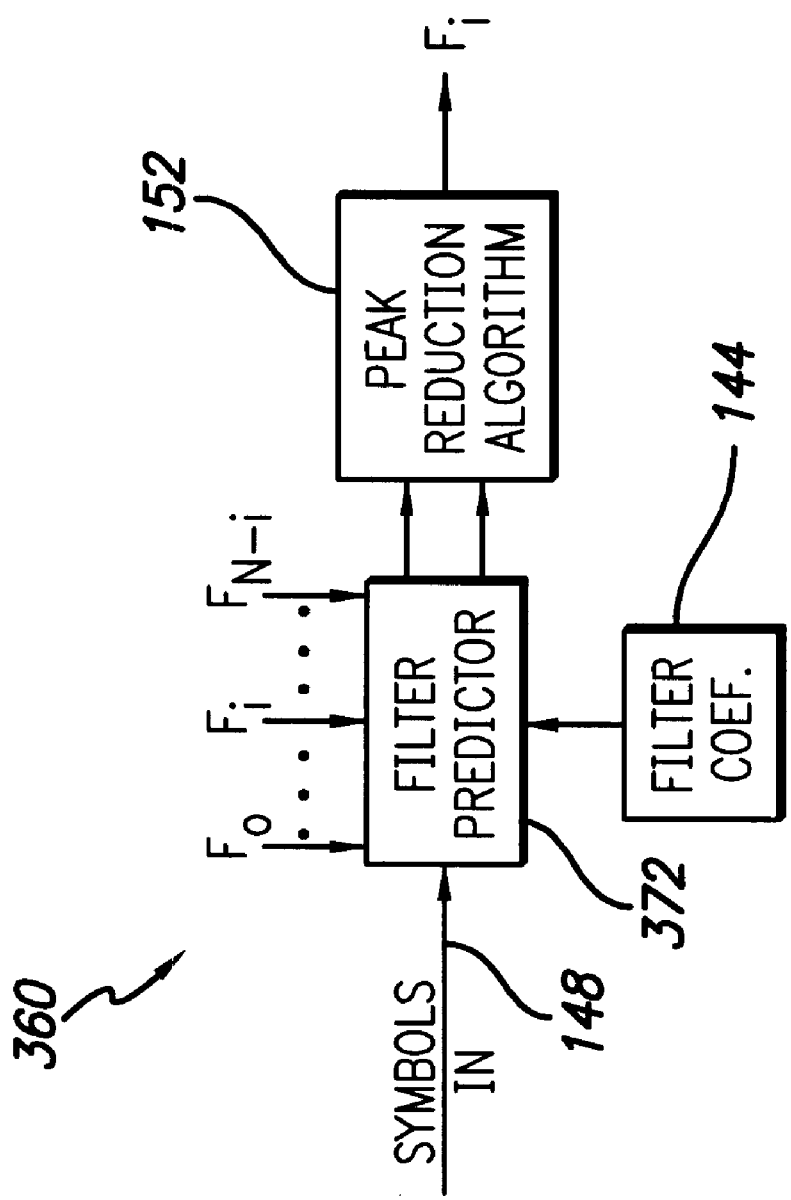
FIG. 24 is a block schematic drawing illustrating one peak reduction stage of the multi-stage peak reduction unit of FIGS. 22 and 23, in accordance with the present invention.

Referring to FIG. 24, one stage 360 of the parallel peak reduction unit of FIGS. 22 and 23 is illustrated. As shown, the input symbols to the stage 360 are first provided to filter predictor 372 which performs a filter prediction processing employing filter coefficients at a specific offset-symbol timing, illustrated as provided from filter coefficient supply 144. Filter coefficient supply 144 may be hardwired into the circuitry or may take the form of a suitable memory such as a register in a suitably programmed DSP implementation of the peak reduction unit. As noted above, the specific sample offset timing for the filter coefficients supplied to the filter predictor 372 correspond to selected sample offset timings at the up sampled rate of the actual filter employed in the system. Thus, for example, sample timings such as illustrated in FIGS. 12–21 may be employed for the filter coefficients stored in filter coefficients supply 144 for each specific stage 360.

The filter predictor 372 outputs the two predicted filtered outputs described in FIG. 9, to the peak reduction algorithm circuit 152 which implements a suitable peak reduction algorithm to determine a peak reduction value, if necessary, to reduce the peak to a desired limit value. The calculated peak reduction value is output from stage 360 as a feedback value $F_i$ which is provided to its own internal filter predictor 372 and to the filter predictors of other parallel branches 360-1 of FIGS. 22 and 23.

Figure 25:
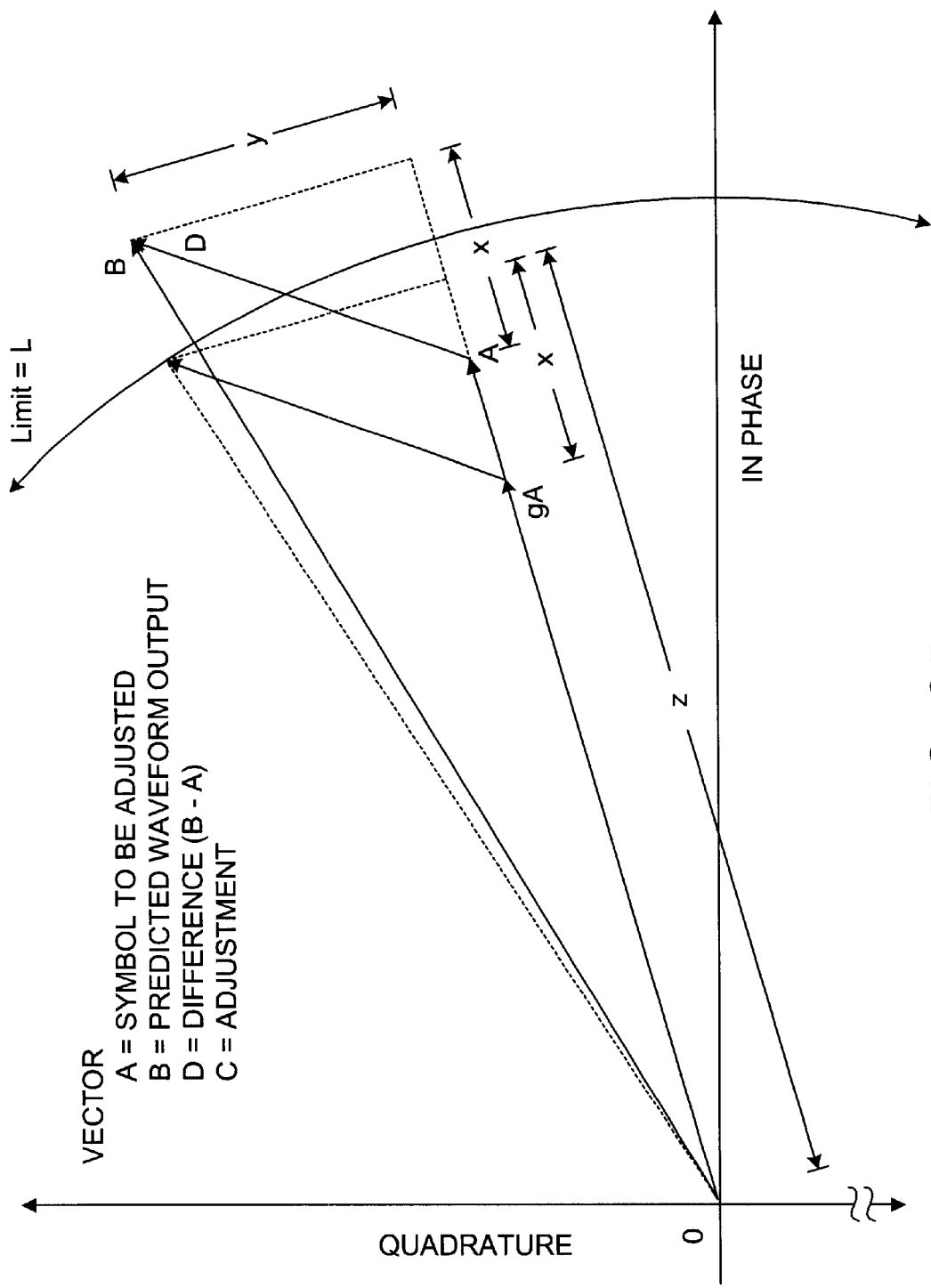
FIG. 25 is a complex vector diagram illustrating vectors employed in a peak reduction algorithm in accordance with the present invention.

As noted above a variety of different algorithms may be implemented in the peak reduction algorithm circuit 152 of FIGS. 9, 10, and 24. One such algorithm is illustrated in FIG. 25. FIG. 25 shows a complex vector diagram illustrating the filter output based on a filter coefficient weighted sum of input symbols using all input coefficients and a filter coefficient weighted sum of input symbols where only the center filter coefficients and matching centered symbols are used.

From these two inputs a correction value is calculated for the filter centered symbols suitable to place the filter output within the preset limit value L. The algorithm illustrated in FIG. 25 was specifically designed to induce only amplitude errors to the input symbols. Some communication systems are more tolerant to amplitude errors than phase errors.

More specifically referring to FIG. 25, the output of the filter based on the center input symbols is illustrated by vector A. The predicted filter output based on multiple input symbols, including the center input symbols, is indicated by vector B. The vector D is calculated by taking the difference of these two vectors. Vector D therefore represents the multi-symbol output from the filter with the center symbol vector A missing. The output gA represents a gain adjusted version of vector A which when added to D pulls the filter output back to. the limit level L. The remaining vectors shown in FIG. 25 are used to calculate the gain g. The gain g is calculated by the following series of vector computations.

$$L^2 = z^2 + y^2 \quad (1)$$

$$z = \sqrt{L^2 - y^2}$$

$$g|A| = \sqrt{L^2 - y^2} - x$$

$$x = \frac{D \cdot A}{|A|}$$

$$y = \left| D - \frac{(D \cdot A)A}{|A|^2} \right|$$

$$g = \left( \sqrt{L^2 - \left| D - \frac{(D \cdot A)A}{|A|^2} \right|^2} - \frac{(D \cdot A)}{|A|} \right) \frac{1}{|A|}$$

This algorithm may be implemented in peak reduction algorithm circuits shown in FIGS. 9, 10 and 24 through use of a suitably programmed DSP or other processor. Since the algorithm involves taking a square root of vector quantities it can be somewhat calculation intensive and therefore it may be desirable to employ an approximate algorithm which nonetheless will provide adequate symbol correction in most cases. In particular, if it is assumed that the difference between the predicted output B and the single symbol output A is relatively small, i.e. D in the above equation is small. The following approximate formula can be used to calculate the gain g needed to reduce the filter output to the limit value L.

$$g \approx \frac{L + |A| - |B|}{|A|}, \text{ for small } 'D' \quad (2)$$

The value of gain calculated using the above exact or approximate algorithm is then applied to the combiner 168 illustrated in FIG. 9. The combiner may simply be a multiplier circuit which multiplies the gain g and the input symbol which produced the output vector A. Alternatively, the combiner may be changed to a summing circuit if the gain calculations found in (1) and (2) above are converted to a vector adjustment provided through equation (3) below. The value $g_c$ is the gain applied by the filter on the center symbols which produced vector A in FIG. 25.

$$V = (A - gA)\frac{1}{g_c} \quad (3)$$

Figure 26:
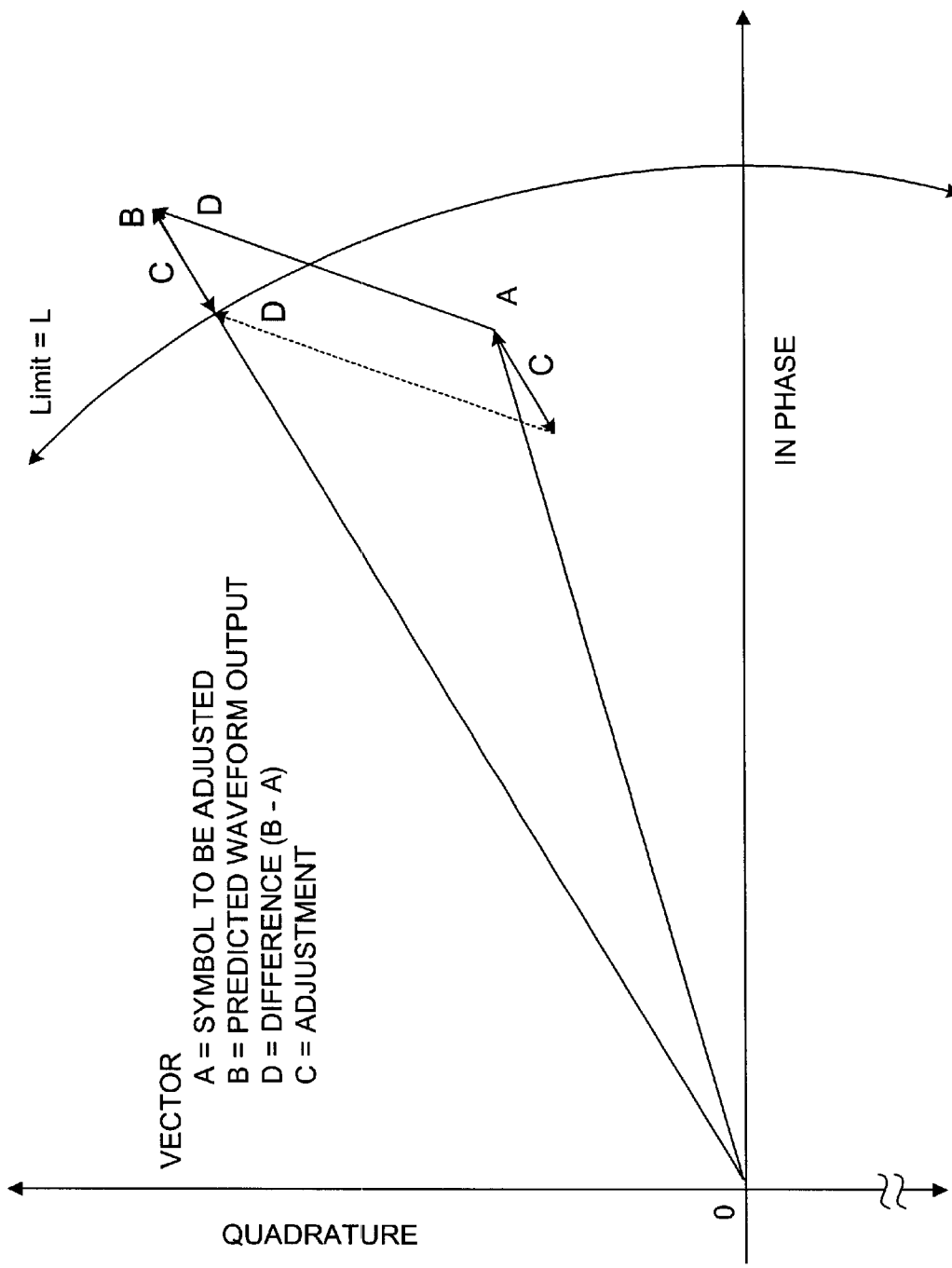
FIG. 26 is a complex vector diagram illustrating vectors employed in an alternate peak reduction algorithm in accordance with the present invention.

As noted above, a variety of different algorithms may be used to calculate the symbol adjustment that places the predicted filter output within the limit value L. One such additional algorithm is illustrated in relation to FIG. 26 which shows the calculation of a correction vector that is combined with the center input symbols through addition. The algorithm differs from that of FIG. 25 in that the adjustment permits phase errors in order to minimize the total distortion energy added. More particularly, as illustrated in FIG. 26 the vectors A, B, and D have the same meaning as in relation to FIG. 25. In FIG. 26 the value C is the additive adjustment made to the predicted filter output to place it at the limit value L. Although a variety of adjustment vectors could be added to place the resulting vector at the limit value L, it is desirable to minimize the size of the vector C and hence the amount of correction since any changes made to the input symbols potentially result in some distortion in the signal. Applying basic vector algebra to the vectors illustrated in FIG. 26 results in the following equation to determine the correction C to be applied to the center symbol filter output A to get the desired peak reduced output within the limit value L:

$$C = \left(L\frac{B}{|B|} - B\right) \quad (4)$$

Before addition with the symbol adjustment, the above vector must be gain adjusted by the inverse filter gain applied to the center symbols used to calculate the vector C. The resulting algorithm for adjusting symbols for peak reduction is given in (5). This algorithm may be implemented in a suitably programmed DSP or other hardware or software implemented circuitry.

$$V = \left(L\frac{B}{|B|} - B\right)\frac{1}{g_c} \quad (5)$$

The value of the correction vector calculated in equation (5) above is then applied to the combiner 168 illustrated in FIG. 9. The combiner may simply be an addition circuit which adds the vector V to the center symbols which produced the output vector A. Alternatively, the combiner may be changed to a multiplier circuit if the vector calculation found in (4) is converted to a gain adjustment provided through equation (6) below.

$$g = (A + C)\frac{1}{A} \quad (6)$$

It should be appreciated by those skilled in the art that the two algorithms illustrated in FIGS. 25 and 26, respectively, are purely illustrative in nature and a variety of different algorithms may suitably be employed and may be implemented in a DSP or other circuitry comprising peak reduction algorithm circuit 152 illustrated in FIGS. 9, 10, and 24.

Figure 27:
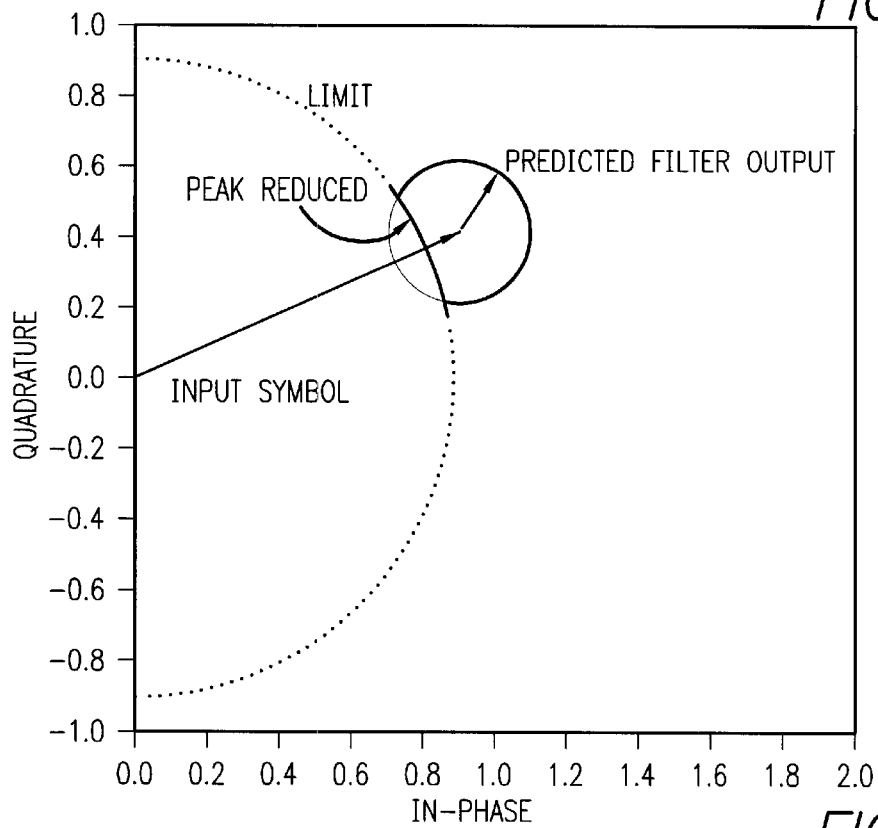
FIG. 27 is a complex figure diagram illustrating predicted filter output values and a peak reduction operation for a specific example of an input symbol value, in accordance with the present invention.
Figure 28:
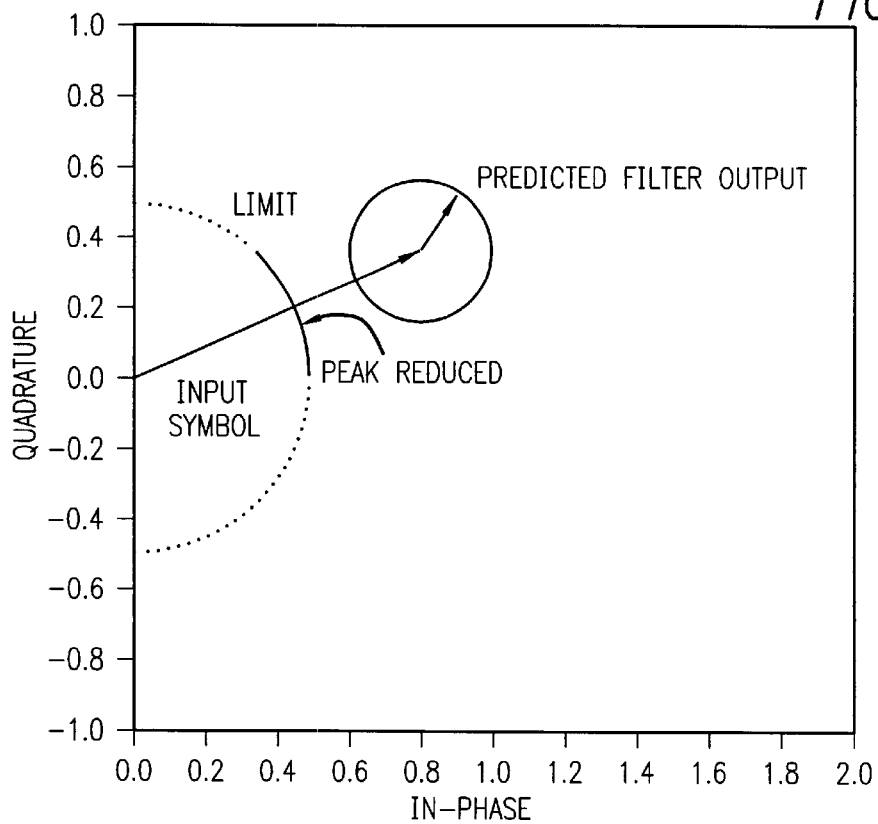
FIG. 28 is a complex figure diagram illustrating predicted filter output values and a peak reduction operation on a different input symbol value, in accordance with the present invention.

Referring to FIGS. 27 and 28, examples of the peak reduction processing in accordance with the present invention are illustrated in two complex vector diagrams. FIGS. 27 and 28 apply to the case where only one center symbol is adjusted. The input symbol shown could however represent the combination of two center symbols. As shown in FIGS. 27 and 28, input symbols are provided with filter predictor processing. Since the output of the filter is dependent on many symbols in time, not just the center symbol to be adjusted, the output can be represented as the center symbol and circle representing the affect of symbols neighboring in time.

Although the center symbol exceeds the limit value initially in both examples, in the example of FIG. 27 a portion of the circle representing the filtered outputs actually lies within the limit line. These output values are therefore not subject to peak reduction processing. The remainder of the outputs, illustrated in bold in the complex diagrams of FIGS. 27 and 28, are subject to peak reduction processing by an amount varying with the extent the filtered symbol exceeds the limit line. The symbols are then adjusted so the predicted filter output is pulled back to the limit line, as illustrated by the bold portion of the limit line in FIGS. 27 and 28. Therefore, it will be appreciated that symbols not requiring peak limit processing are left untouched, thereby reducing any distortion introduced via such reduction, but also symbols which do require peak reduction processing are provided the minimum amount of peak reduction necessary to place the filtered outputs within the limit value. Conversely, symbols that may initially not appear to require peak reduction processing will be peak adjusted if the filter prediction shows that the filter output will exceed the limit value. Accordingly, it will be appreciated that the present invention provides highly effective signal peak reduction while at same time minimizing distortion introduced into the symbol train.

Figure 29:
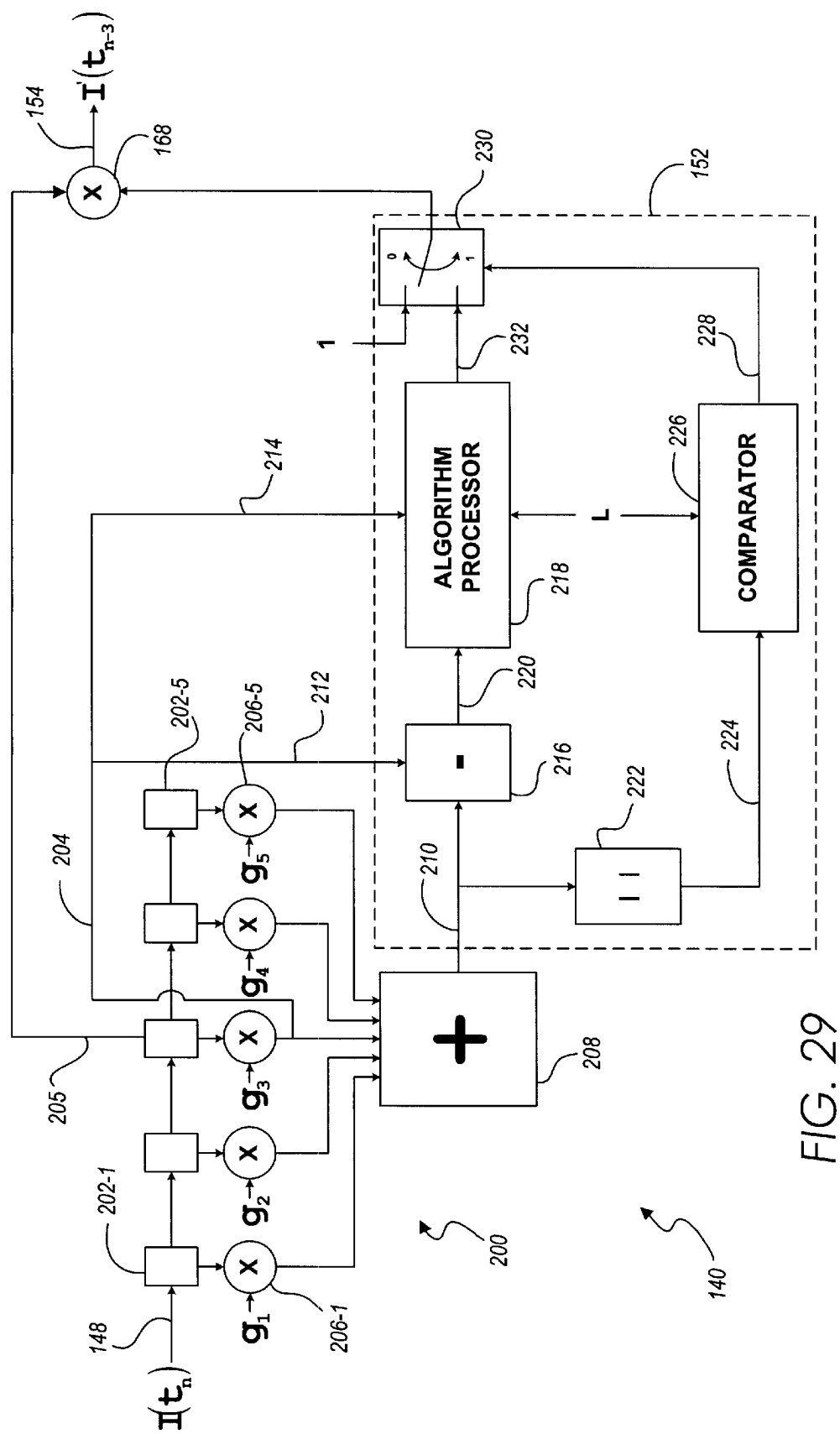
FIG. 29 is a block schematic drawing illustrating a detailed embodiment of one stage of the peak reduction unit, in accordance with the present invention.
Figure 30:
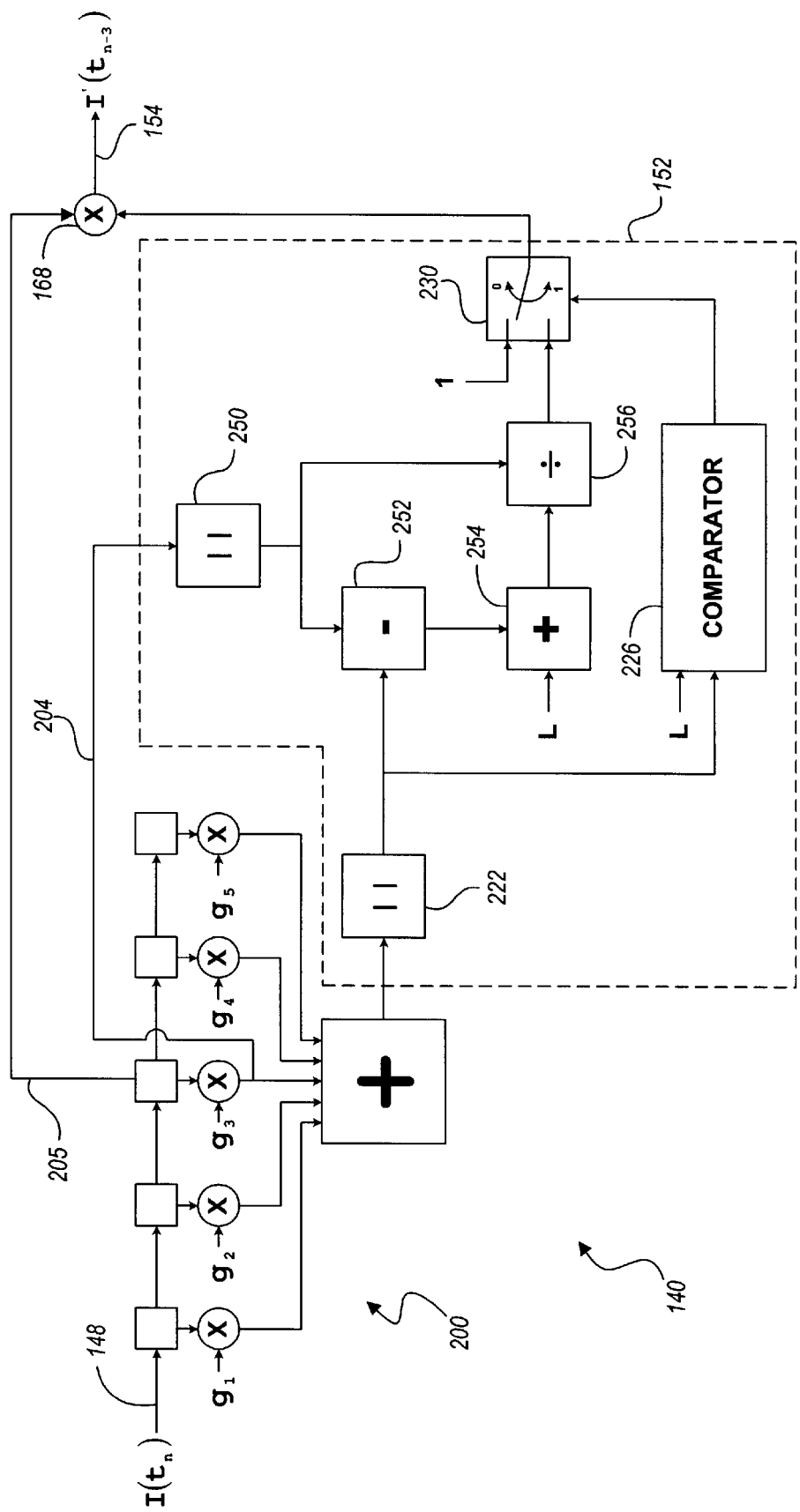
FIG. 30 is a block schematic drawing illustrating a detailed embodiment of one stage of the peak reduction unit implementing an approximate peak reduction algorithm, in accordance with the present invention.
Figure 31:
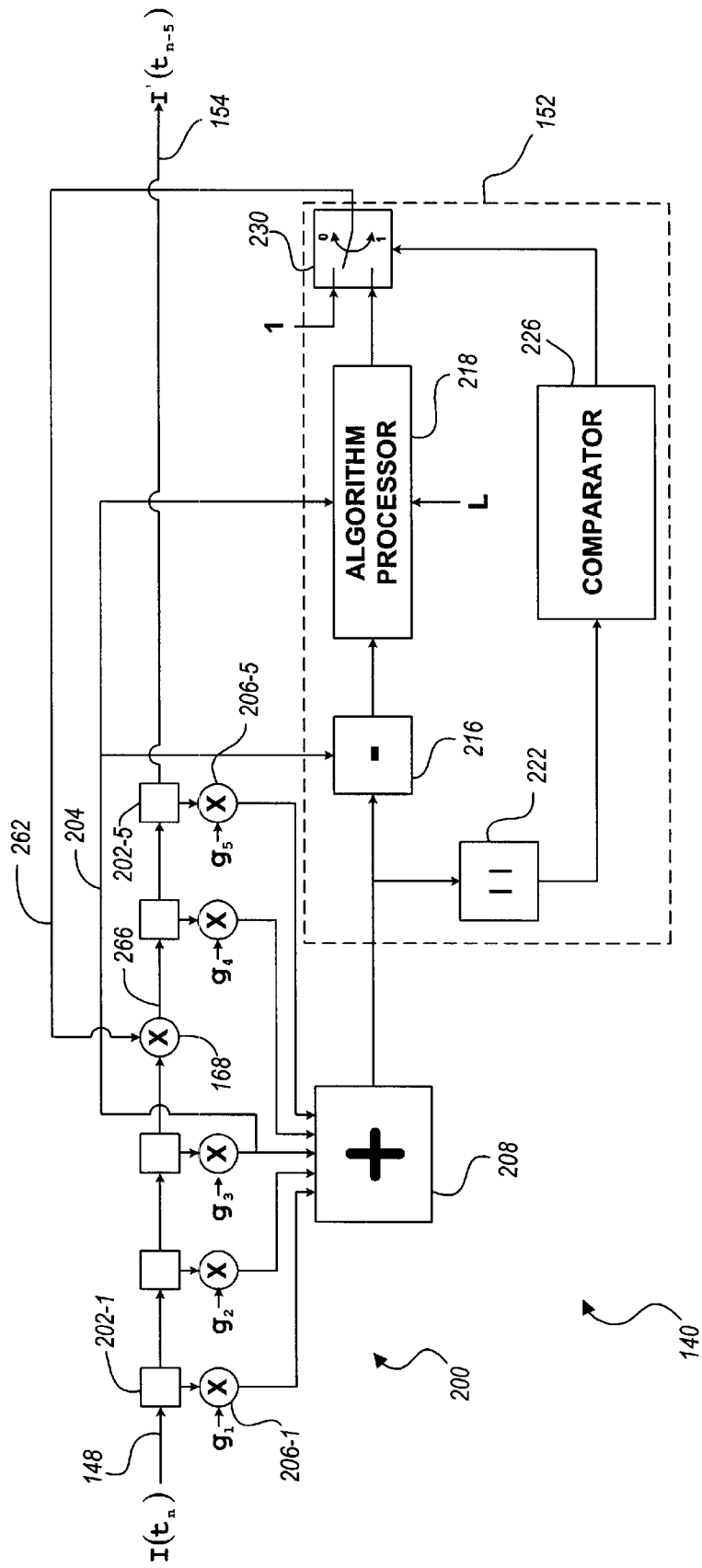
FIG. 31 is a block schematic drawing illustrating a detailed embodiment of one stage of the peak reduction unit employing feedback, in accordance with the present invention.
Figure 32:
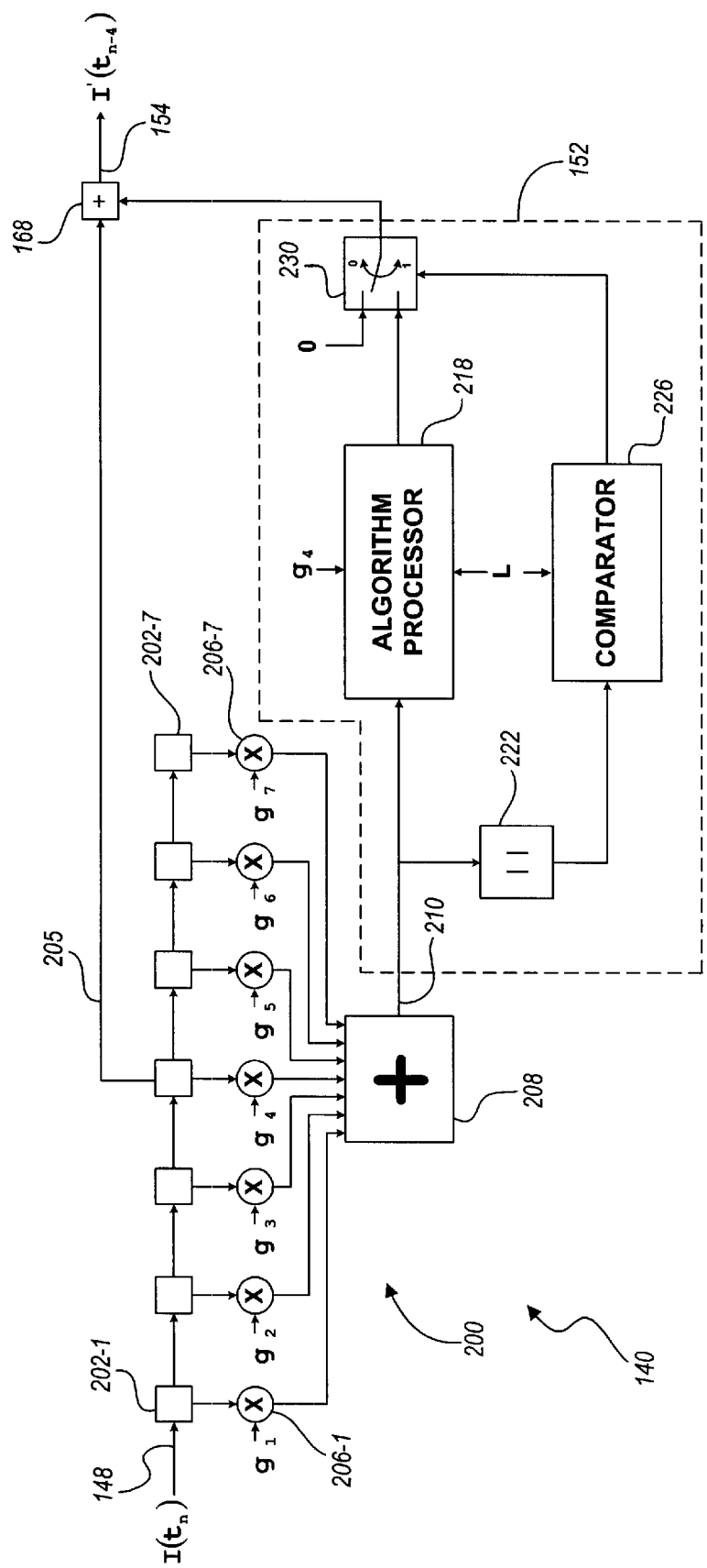
FIG. 32 is a block schematic drawing illustrating a detailed alternate embodiment of one stage of the peak reduction unit, in accordance with the present invention.
Figure 33:
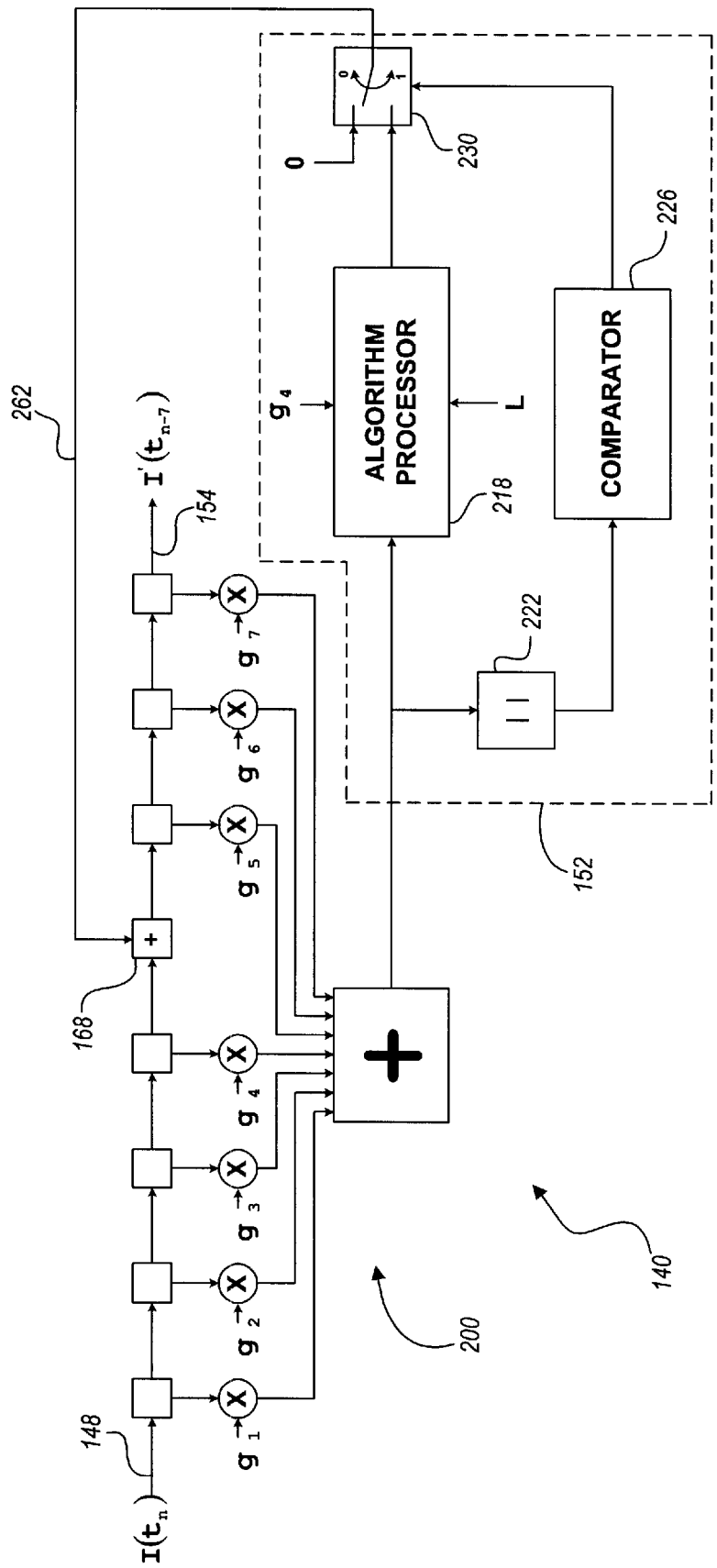
FIG. 33 is a block schematic drawing illustrating the alternate embodiment shown in FIG. 32 while using feedback, in accordance with the present invention.
Figure 34:
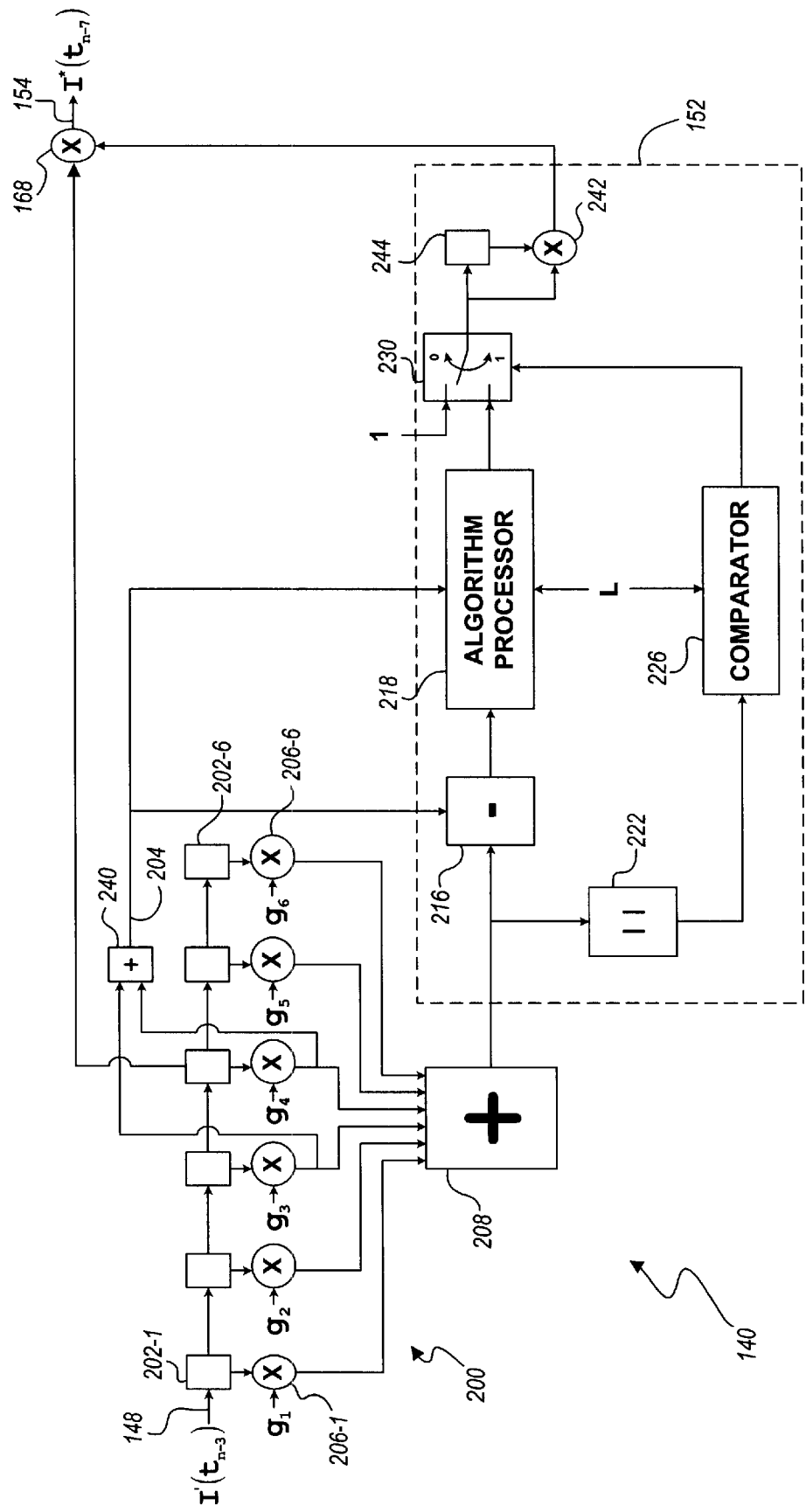
FIG. 34 is a block schematic drawing illustrating a detailed embodiment of one stage of the peak reduction unit operating at the inter-symbol interval, in accordance with the present invention.
Figure 35:
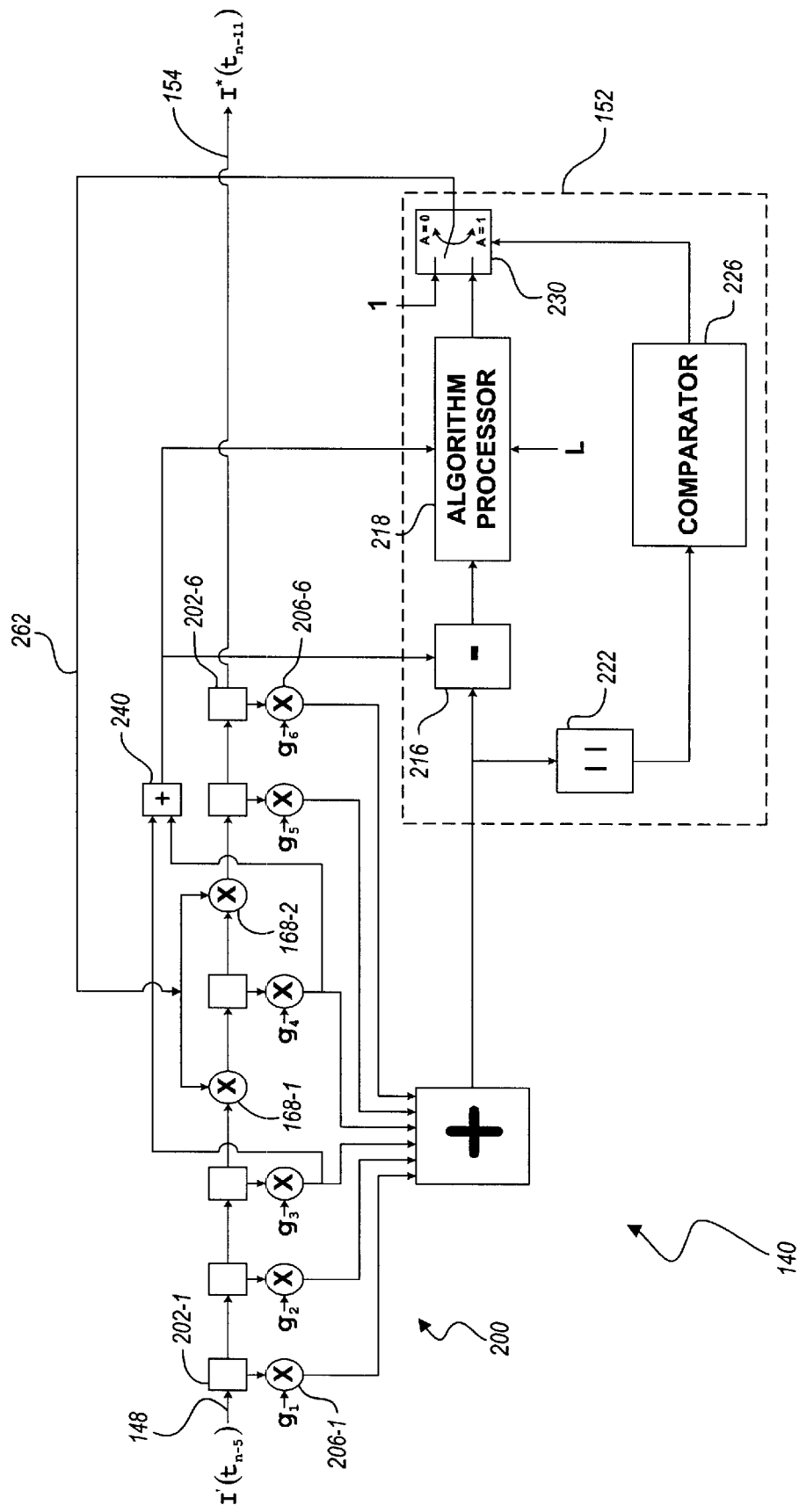
FIG. 35 is a block schematic drawing illustrating the detailed embodiment shown in FIG. 34 using feedback.

FIGS. 29 through 35 show different embodiments of peak reduction units using the algorithms given in equations (1), (2), (3), (5), and (6). FIGS. 29, 30, 32, and 34 represent the peak reduction processing shown in FIG. 9. FIGS. 31, 33, and 35 represent the reduction processing shown in FIG. 10. An example of the parallel processing shown in FIGS. 23 and 24 will be given in FIGS. 36A and 36B.

Referring to FIG. 29, an embodiment of the peak reduction unit using equation (1) is illustrated in a block schematic drawing. As shown in FIG. 29, employing a multi-tap filter 200 may advantageously combine the delay circuit 166 and the filter predictor circuit 146 shown in FIG. 9. The filter 200 includes a plurality of individual memory registers 202 of which 5 are illustrated in the specific embodiment of FIG. 29. It should be appreciated however that additional or fewer delay memory registers may be provided and in general N such memory registers 202 will be provided forming an N element shift register. By tapping a memory register output, e.g., at the center memory register, a delayed symbol train may be provided so that the peak correction can be done on a correctly timed symbol-by-symbol basis at the combiner 168. Such a delayed output from the N element memory registers is illustrated by line 205 and thus corresponds to the output of the delay circuit 166 illustrated in FIG. 9. The output provided along line 204 is derived from a tap of the center delay stage after multiplication with the center filter coefficient. This line represents the center filtered symbol output (line 145 in FIG. 9 and vector A in FIG. 25) which is provided to the peak reduction algorithm processing circuit 152 as shown in FIG. 29. The delayed outputs from each of the memory registers 202 are provided to a corresponding multiplier 206 which also receives a corresponding filter coefficient as an input thereto. Each filter coefficient thus acts as a gain $g_N$, N=1 to 5, multiplying the symbol output from the corresponding delay stage 202. The filter coefficients $g_N$ may correspond to any of symbol interval coefficients illustrated in FIG. 8 or FIGS. 12–21 depending on which stage in the processing of FIGS. 9 or 11 is represented. Of course, a variety of different filter response functions may be used depending on the particular filter being predicted and the coefficients will vary accordingly. Also, it will be appreciated that additional coefficients may be taken at any symbol interval from the impulse response function with the example of five coefficients being purely illustrative in nature, and more or less than five coefficients may be employed for the particular implementation, depending on the specific impulse response function being modeled as well as the speed of the processing system employed and the desired accuracy.

Still referring to FIG. 29, the outputs from the multiplier circuits 206 are provided to summing circuit 208 which sums the plural outputs and provides them along line 210. The output along line 210 corresponds to a filter coefficient weighted sum of symbols taken at a specific symbol interval and thus corresponds to a model of the filter impact on the symbols at that interval. This predicted filter symbol output is provided along line 210 as an input to the peak reduction algorithm circuit 152. The peak reduction algorithm circuit 152 also receives the delayed center symbol filter output along line 204 as noted above. This delayed center symbol filter output stream is provided along line 212 to a subtraction circuit 216, and along line 214, to algorithm processor 218. Subtraction circuit 216 thus receives the filtered outputs provided along line 210 as one input thereto and the delayed center symbol filter outputs along line 212 as a second input thereto. Subtraction circuit 216 takes the difference these two output streams, providing a symbol-by-symbol difference value D (D=B−A using the terminology of FIG. 25) along line 220 to algorithm processor 218. The algorithm processor 218, which receives the two input symbol streams along line 220 and 214, also receives the limit value L as input. The algorithm processor 218 computes the gain g using equation (1) to reduce the filtered outputs to a value lying within the limit value L.

In a more general case the subtraction circuit 216 would be combined with the algorithm processor 218 to create a more general-purpose algorithm processor. With this minor modification to FIG. 29 a variety of different algorithms could be used based on the inputs from lines 204, 210 and the limit value L. In this more general-purpose case either the approximate algorithm given in equation (2) or algorithm based on FIG. 26, given in equation (6), could be used.

In either the specific case shown in FIG. 29 or in the more general-purpose case described, the computed gain value g from the algorithm processor 218 is output along line 232 to selection switch 230.

Still referring to FIG. 29, the filtered output stream provided along line 210 is also provided to magnitude detection circuit 222. The magnitude detection circuit 222 determines the magnitude of the filtered outputs, i.e., the absolute value of the complex vector quantity comprising the outputs, which magnitude is provided as an output along line 224. This magnitude is provided to comparator 226 which compares the magnitude of the filtered symbols to the limit value L. If the magnitude of the filtered symbol exceeds the limit value L the output from the comparator 226 takes a first value (e.g., "1"). If the magnitude of the filtered symbol is less than the limit value L then the output from the comparator 226 is a second value (e.g., "0"). This value, i.e. a "0" or "1", is then provided as an output along line 228 to selection switch 230. If the input to the selection switch 230 along line 228 is a 0, then the output from the selection switch 230 is a unit signal which has no affect on the symbol stream provided along line 205 to combiner 168 (illustrated as a multiplier in the specific embodiment of FIG. 29). If the signal provided along line 228 to selection switch 230 is a one, corresponding to the filtered symbol value exceeding the limit value L, then the computed gain value g provided from algorithm processor 218 is output to multiplier 168. In this way the symbol stream provided along line 205 will be gain reduced by the appropriate value computed by the algorithm only if necessary on a symbol-by-symbol basis and appropriately peak adjusted symbols will be output on line 154.

It will be appreciated that the various circuit elements illustrated in FIG. 29 may be implemented solely in hardware, solely in software, i.e., as a suitably programmed DSP or other processor, or may be implemented as a combination of hardware and software. For example, it may be advantageous for the filter 200 to be implemented as hardware whereas the algorithm processor 218 is implemented as a suitably coded DSP processor. Alternatively, the circuitry of algorithm processor 218 may be implemented as a programmable gate array circuit. Also, filter 200 and/or difference circuit 216 and magnitude detector 222 may be implemented as a gate array circuit and combined with a processor based circuit 218. Therefore, it will be appreciated that a variety of different combinations of implementations of the circuitry illustrated in FIG. 29 are possible.

Referring to FIG. 30, an alternate embodiment of the peak reduction unit shown in FIG. 29 is illustrated. In the embodiment of FIG. 30, the peak reduction algorithm is implemented in a simplified peak reduction algorithm circuit 152 that utilizes an approximate equation for the peak reduction to be applied to the input symbols. In particular, the specific embodiment illustrated in FIG. 30 may implement the equation (2) described above that provides an approximate calculation for the gain g applied to the symbol vector to bring it to the limit value L.

As may be seen, the equation involves relatively simple calculations involving the limit value L, the magnitude of the center symbol filter output A, and the magnitude of the predicted filtered output B. Comparing this equation to the circuitry of peak reduction algorithm circuit 152 illustrated in FIG. 30 shows that circuit 222, 250, 252, 254 and 256 implement equation (2) in a straightforward manner. More specifically, line 204 along with the magnitude detection circuit 250 provides the magnitude of the center symbol filter output A. The predicted filtered output is provided from filter 200 to magnitude detection circuit 222 which determines the magnitude of the predicted filtered output B. These two magnitudes are provided to subtraction circuit 252, which performs a subtraction of the symbol magnitudes to provide the value $|A|-|B|$. Adder circuit 254 (which may be a subtraction circuit if circuit 252 interchanges its inputs) then adds this value provided from circuit 252 to the limit value L. The center filtered output provided from circuit 250 is provided to division circuit 256 which also receives the output of circuit 254 to provide the approximate peak reduction gain g given by the above equation (2).

It will therefore be appreciated that the circuit implementation illustrated in FIG. 30 for the peak reduction algorithm circuit 152 provides a relatively simple implementation that may be easily provided in hardware. This hardware may take the form a programmable gate array or other hardware implementation, or in a relatively simple program implemented in a DSP or other processor. This relative simplicity of the implementation shown in FIG. 30 can have cost and/or speed advantages and may be preferred in particular applications. The remainder of the circuitry in the embodiment illustrated in FIG. 30 may be precisely the same as illustrated in FIG. 29, and may operate in exactly the same manner as described above. Therefore, the operation of this common circuitry will not be repeated for describing the embodiment of FIG. 30.

Referring to FIG. 31, an alternate embodiment of the peak reduction unit is illustrated. The embodiment of FIG. 31 employs feedback from the output of the peak reduction algorithm circuit 152 to the filter predictor to increase the accuracy of the filter prediction operation. FIG. 31 therefore represents one embodiment of FIG. 10. More specifically, as in the previously described embodiments, the filter predictor and the delay circuit are preferably combined in a finite element filter 200 which incorporates a plurality of memory registers 202 which receive the input symbols and operate as an N element shift register. As in the case of the embodiment of FIG. 29, the output of the memory registers are provided to multiplier circuits 206 which also receive the filter coefficients as inputs thereto. The multiplier outputs are provided to adder circuit 208 to provide the filtered output symbols also as in the case of the embodiment of FIG. 29. The peak reduction algorithm circuit 152 illustrated in FIG. 31 also corresponds to that in FIG. 29, however, it may be modified to implement a variety of different algorithms as has been discussed above in relation to previous embodiments.

In contrast to the embodiment of FIG. 29, in FIG. 31 the output of the peak reduction algorithm circuit 152 is fed back to the filter 200. In particular, the output of the peak reduction algorithm circuit 152 is provided back along line 262 to a multiplier 168 which provides the peak reduction gain calculated by the circuit 152 to the output of the center delay stage of the N stage memory registers of filter 200. As a result, the output of the multiplier 168 provided to the downstream stages of the memory registers includes the already gain reduced symbol values. This will more accurately reflect the actual processing by the filter 126 (referring to FIG. 6) since the gain reduced symbols will be included in the computation of the filtered symbol by filter 200. Therefore, the embodiment illustrated in FIG. 31 may in many cases provide a more accurate filter prediction and may be preferred in some applications.

A similar feedback extension can be made to the embodiment shown in FIG. 30 where equation (2) is specifically defined by a unique block diagram. This extension should be easily understood by those skilled in the art.

As stated above, the feedback modification provides an adjusted symbol for all following peak adjustment calculations. Prior to modification however, the pre-adjusted symbol was used to calculate peak adjustments preceding the adjustment time. This means that when the adjusted symbol stream is passed through the filter (20 in FIG. 6) the adjusted symbol will participate in creating peaks both preceding and following the adjusted symbol. New peaks therefore can be created preceding the adjusted symbol. These new peaks are the result of the causal or non-anticipatory nature of the peak adjustment process. Simply repeating each stage in the peak reduction processes shown in FIGS. 7, 11, 22 and 23 can easily eliminate these new peaks.

Previous embodiments described symbol adjustments based on gain corrections that can be calculated from equations (1), (2) and (6). Symbol adjustments can also be base on adding vectors that can be calculated from equations (3) and (5). Referring to FIG. 32, one embodiment that adjusts symbols based on adding vectors is illustrated. In the embodiment of FIG. 32 the delay circuit 166 of FIG. 9 is implemented as part of a series of memory registers forming part of the filter predictor circuit 146 in a similar manner to embodiments described previously. More specifically, filter 200 includes a plurality of the memory registers 202 which may operate as an N element shift register, the specific illustration being a 7 element shift register. The output of the center stage of the memory registers is tapped as an output to provide the delayed symbols along line 205 to combiner 168. Combiner 168 is illustrated as an adder circuit. The output of the memory register stages are provided to multiplier circuits 206 which also receive as inputs thereto filter coefficient values at the particular symbol timing corresponding to that stage. The outputs of the multipliers 206 are provided to summing circuit 208 which outputs a predicted filter output value along line 210, similarly to previously described embodiments.

The predicted filter outputs along line 210 are provided to the peak reduction algorithm circuit 218 which implements a particular peak reduction algorithm on the predicted filter outputs and provides the reduction value, if any, to combiner 168. In the embodiment of FIG. 32 a particularly simple algorithm may be implemented that does not require an input from the center filtered symbol output along line 204 but simply operates on the predicted filter outputs provided along line 210. The algorithm also employs as input the desired limit value L and the gain of the center tap of the filter predictor, $g_4$ for the particular embodiment shown. Such an algorithm may correspond to equation (5) described above in relation to FIG. 26. Other algorithms however, may also be employed within circuit 338. Such other algorithms may require an input from the symbol stream provided along line 204 and the possibility of such an input to circuit 152 in FIG. 32 is understood in the case of such alternate embodiments. Just such an algorithm is given in equation (3) where the value g in equation (3) is calculated in equation (1).

In the illustrated embodiment of the circuit 152, the magnitude of the predicted filter outputs provided along line 210 is determined by magnitude detection circuit 222. This is provided to a comparator 226 which compares the magnitude of the predicted filter output values to the threshold L. The predicted filter outputs are also provided to algorithm processor circuit 218 which may be a suitably programmed DSP or other processor which implements equation for the particular embodiment shown or other suitable algorithm which operates on the predicted symbols. Alternatively, the algorithm processor 218 may be implemented in a gate array structure or other hardware implementation. The output from the algorithm processor 218 is provided to selector switch 230 that also receives the output of the comparator 226. If the predicted symbol value is greater than the threshold value L then the output from the comparator enables the switch 230 to output the peak correction value to combiner 168. On the other hand if the predicted symbol value is less than or equal to the limit value L then the output of the comparator to the selector switch 230 selects a zero output to the combiner 168 corresponding to no peak adjustment to the symbol stream.

Referring to FIG. 33, an alternate embodiment of FIG. 32 is illustrated employing a feedback of the peak adjustment to the filter predictor as given in FIG. 10. More specifically, in the embodiment of FIG. 33, filter 200 receives a fed back peak adjustment value from the peak reduction algorithm circuit 218 along line 262. Filter 200 illustrated in FIG. 33 may correspond to an N stage implementation as in the case of FIG. 32 and therefore need not be described in detail. As illustrated the peak value adjustment provided along line 262 may be provided to a combiner 168, illustrated as an adder in FIG. 33, configured after the center stage of the memory register forming part of filter 200. Therefore, the peak adjustments to the symbols are included in the subsequent stages of the filter providing an additional improvement in the prediction capability of the filter 200. It will be appreciated that different filter implementations may be advantageously implemented with differing feedback locations in the memory registers therein. Therefore, the specific implementation shown in FIG. 33 is purely illustrative and should not be taken as limiting in nature.

Figure 3:
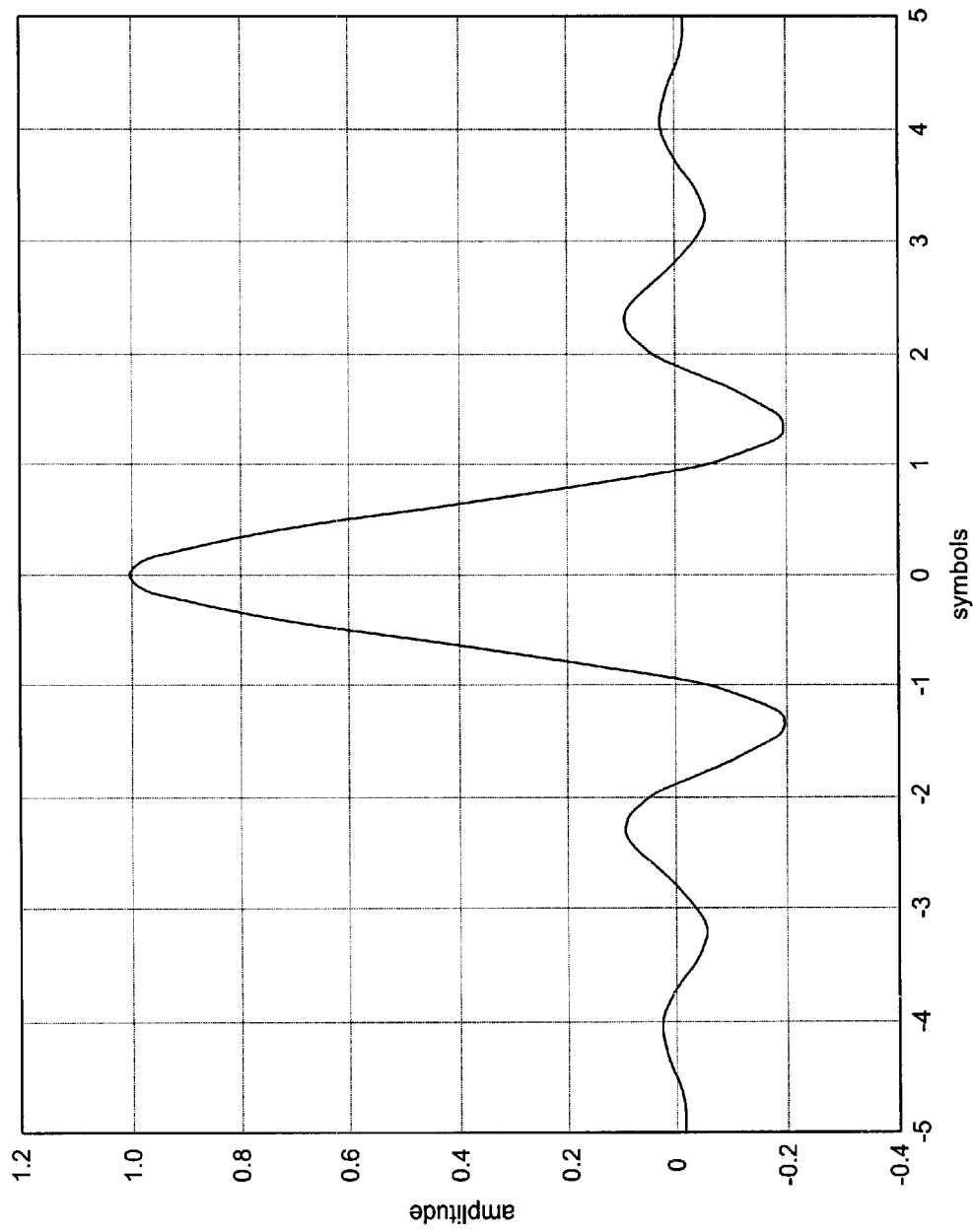
FIG. 3 is a schematic drawing of an impulse response function for a prior art spread spectrum communications system filter.
Figure 4:
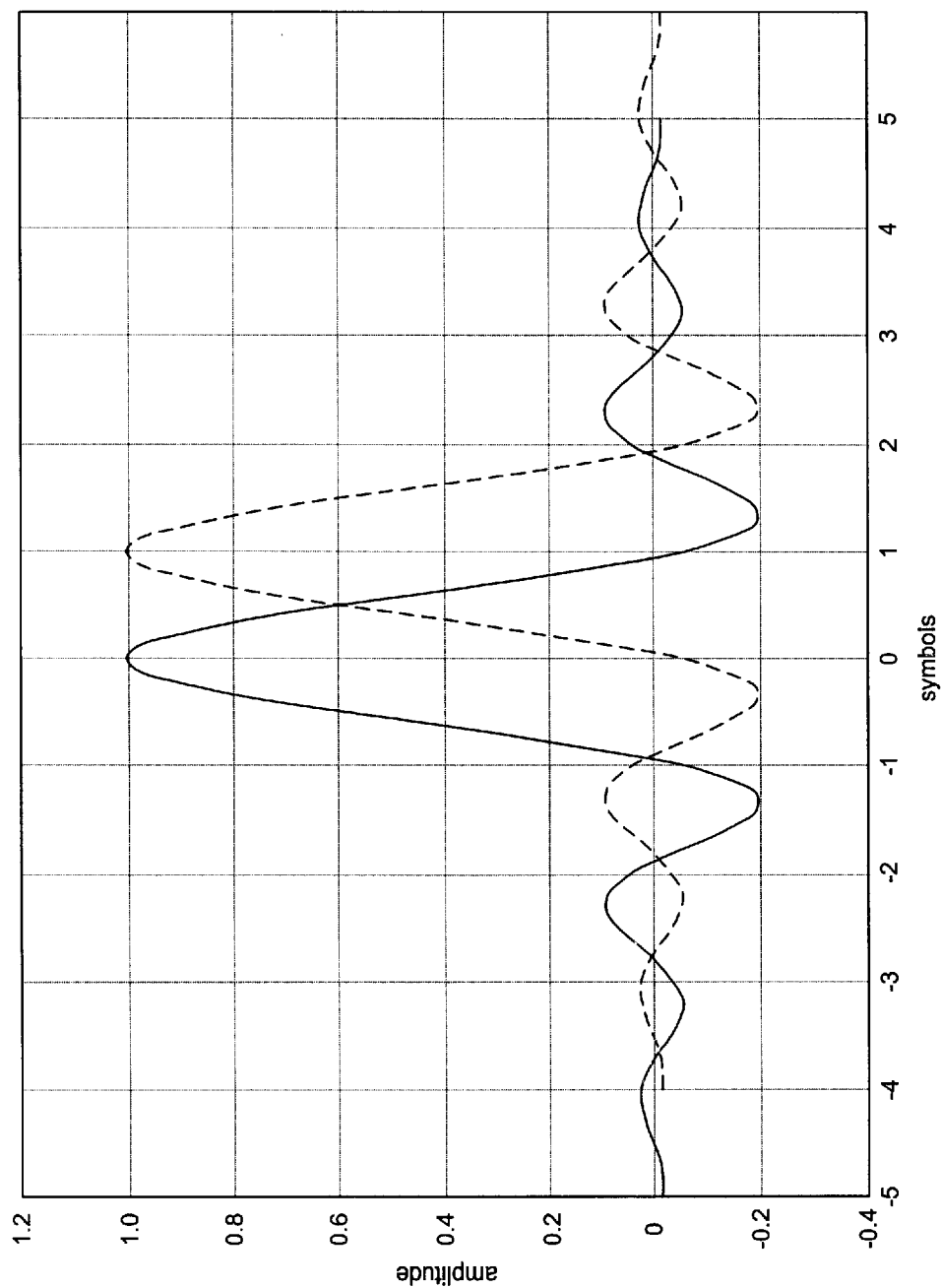
FIG. 4 is a schematic drawing illustrating two consecutive symbols and their filter response function in a prior art spread spectrum communications system.
Figure 5A:
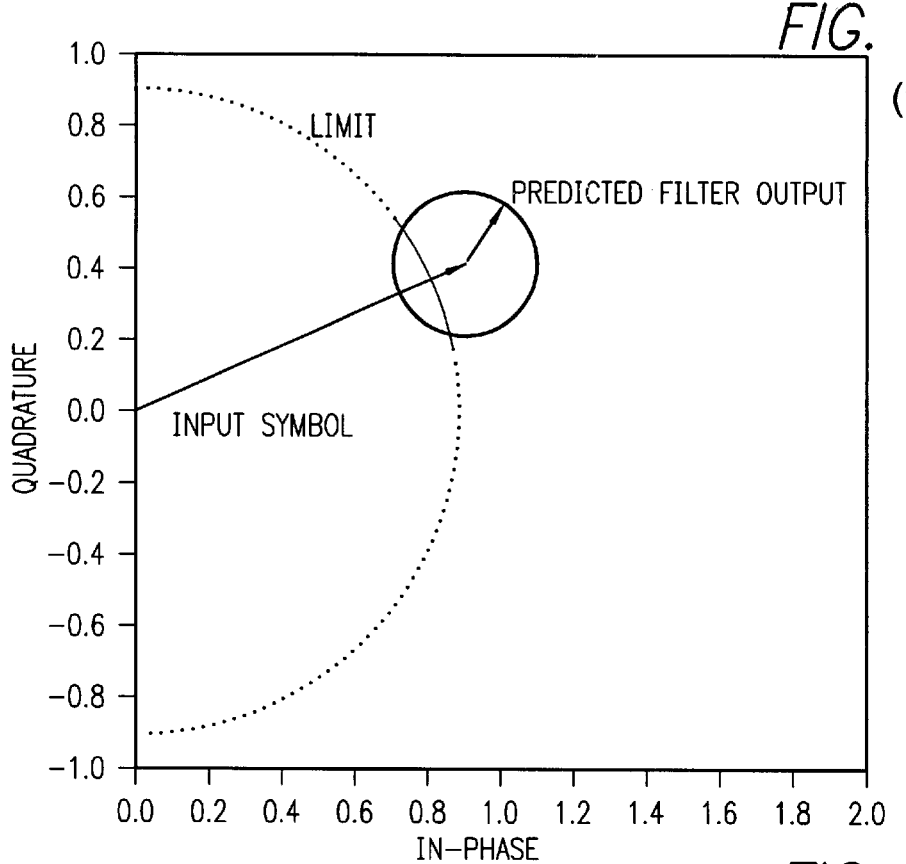
FIGS. 5A and 5B are complex vector diagrams illustrating the effect of filtering on an arbitrary sequence of consecutive symbols in a prior art spread spectrum communications system.
Figure 5B:
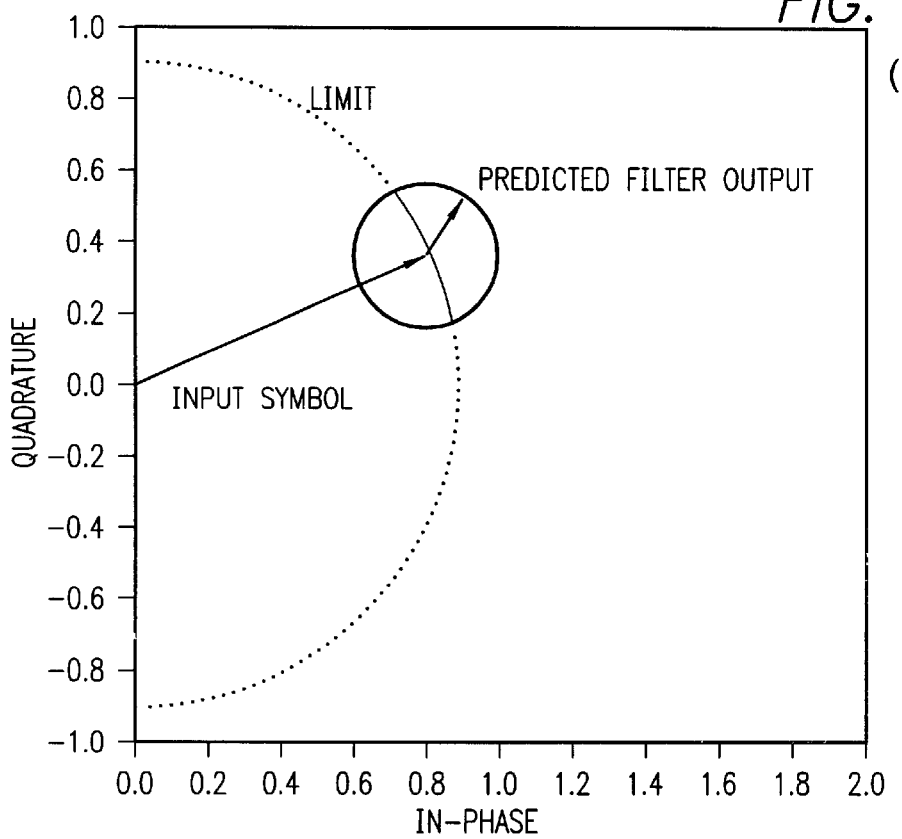

Referring to FIG. 34, a block schematic drawing of an alternate embodiment of the peak reduction circuit unit of FIG. 29 is illustrated. To understand the justification for this alternate embodiment, remember that inter-symbol peaks are dominated by two adjacent similar amplitude symbols. This was described above in reference to FIG. 4. If just on-symbol and inter-symbol adjustments are made, there will be a significant number of similar amplitude symbols after on symbol processing. FIG. 34 substantially corresponds to FIG. 29 except the delay is one element longer and the two adjacent symbols centered in the filter predictor memory registers are adjusted. Both center coefficients have the same value.

The implementation of the circuit shown in FIG. 34 substantially corresponds to that of FIG. 29 and accordingly like numerals are employed for like components, therefore the specific description of each component will not be repeated. As discussed above in relation to FIG. 29, the circuit operates to predict the filter impulse response effect on the input symbols at the inter-symbol interval, using a multi-tap filter 200, and provide peak reduction processing based thereon. Filter 200 corresponds generally to filter 200 in FIG. 29 with the following modifications. The inputs $g_N$, N=1 to 6, to the multipliers 206 are selected from the inter-symbol interval filter coefficients (t=0.5), as illustrated by the crosses in FIG. 8 for the particular impulse response function shown there. As discussed in relation to FIG. 29, the particular filter coefficients are purely illustrative in nature in FIG. 8 and so the inputs $g_N$ are not limited to the specific inter-symbol values shown there. To provide symbol correction to the two symbols dominantly responsible for inter-symbol peaks, a filter output from both center filter taps 202-3 and 202-4 is provided to a summing circuit 240 to create line 204. The line 204 is equivalent to the single symbol filter output A shown in FIGS. 25 and 26. The peak adjustment is then processed as before with the gain correction applied to both center taps through the use of a single element memory register 244 and multiplier 242. Accordingly, it will be appreciated that the output symbol stream on line 154 provides a properly peak adjusted symbol stream adjusted on a symbol-by-symbol basis at the inter-symbol interval but otherwise in the same manner as discussed in relation to FIG. 29. Although the processing is thus preferably the same in FIG. 34 as in FIG. 29, in some circumstances it may be desirable to implement a different algorithm in FIG. 34 from FIG. 29 or otherwise modify the processing at the inter-symbol interval from the on-symbol interval.

Referring to FIG. 35 an alternate embodiment of FIG. 34 that also employs feedback in a manner described in relation to FIG. 31 is shown. More specifically, as shown in FIG. 35 the filter 200 includes a feedback from the peak reduction algorithm circuit 152. This feedback loop provides the gain g for peak reduction calculated by the peak reduction algorithm circuit 152 along line 262 to the N stage memory registers forming part of filter 200. In the particular embodiment illustrated, this fed back gain is provided to multiplier 168-1 and multiplier 168-2 on opposite sides of the fourth memory register. This introduces the symbol gain to both symbols most responsible of inter-symbol peaks. This implementation is based on the specific inter-symbol impulse response function of FIG. 8 and the specific choice of filter delay stages. Therefore, it will be appreciated that a different introduction of the fed back gain into the memory register stages may be provided in a different filter implementation or for a different impulse response function. The output of the stage reduction process is provided from the last stage of the memory registers along line 154 as illustrated. As in the case of the embodiment of FIG. 31, the feed back of symbol reduction into the memory registers can improve the prediction capability of the filter 200 and may be preferred in some cases.

FIGS. 34 and 35 describe alternate embodiments to FIGS. 29 and 31. Similar alternate embodiments can be made to FIGS. 30 and 32. These alternate embodiments should be apparent to those skilled in the art from the foregoing explanation.

Figure 36A:
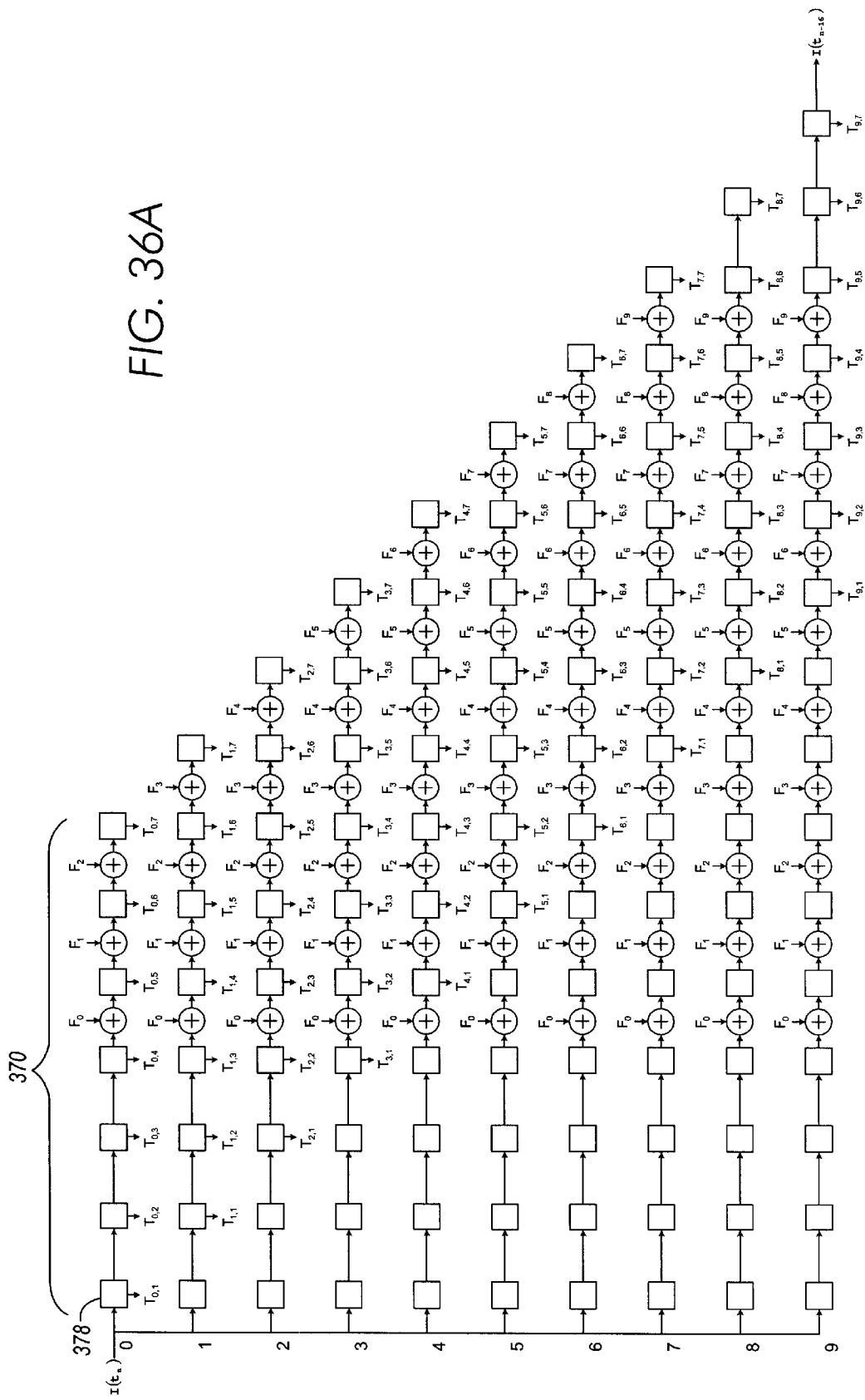
FIGS. 36A and 36B are block schematic drawings illustrating a detailed embodiment of the multi-stage peak reduction unit employing a parallel implementation of the peak reduction stages illustrated in FIG. 23, in accordance with the present invention.
Figure 36B:
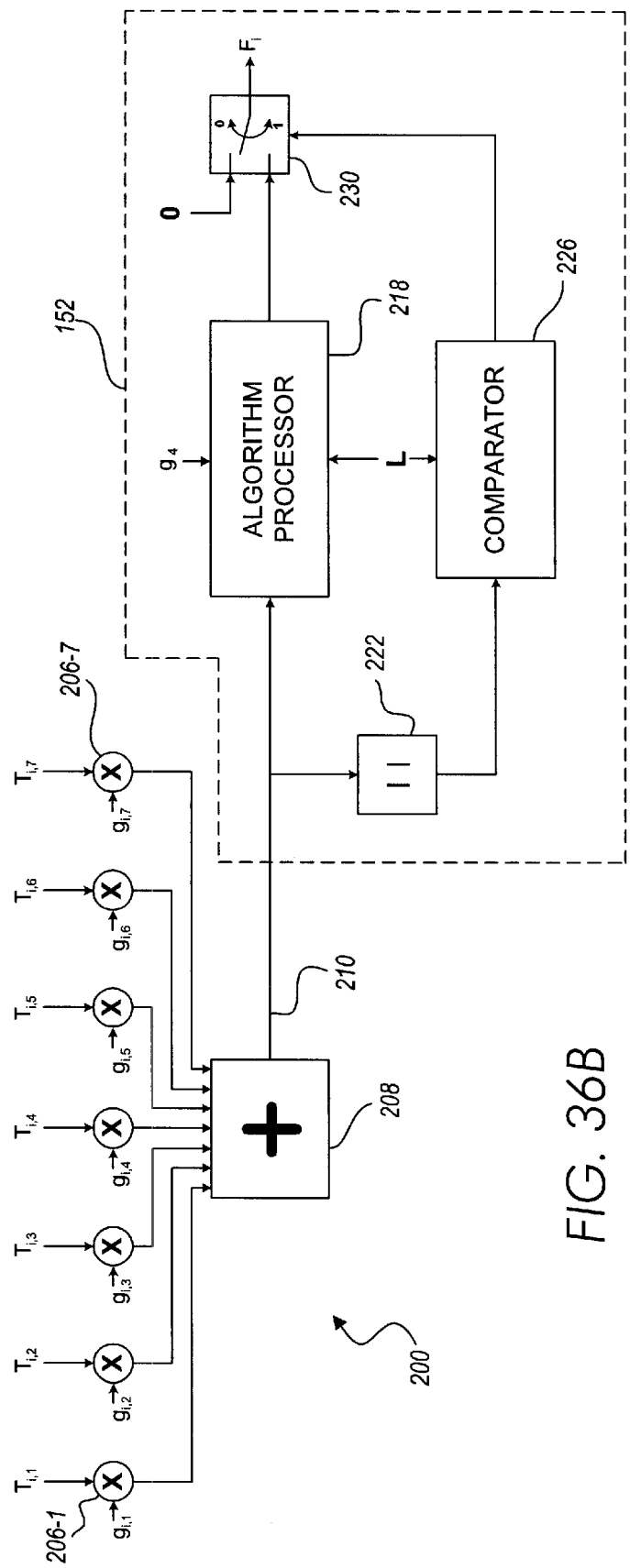

Referring to FIGS. 36A and 36B, a detailed implementation of the parallel multi-stage peak reduction unit of FIG. 23 is illustrated. The particular implementation shown in FIG. 36A includes 10 parallel peak reduction processing stages. It will be appreciated, however, that this is purely illustrative and a greater or lesser number of stages may be employed depending on the particular application. Also as previously mentioned, peaks caused by the causal nature of peak reduction can be removed by repeating stages. In parallel processing this repetition is performed by continuing the periodic sampling of the impulse response function performed in FIGS. 12 through 21 which represent periodic samplings taken a −0.5 to 0.4. Samples taken at t=0.5, will be identical to samples taken at t=−0.4. This duplication of the sampling patterns will continue over the interval t=−0.5 to 0.5. These repeated samplings can then be added to the bottom of FIG. 36A as parallel lines 10, 11, etc.

Each stage includes a delay circuit 370 which as shown may be implemented as a sequence of memory registers 378 each one of which delays the symbol stream by a time corresponding to the time between symbols. As before, taps are taken from these memory registers to calculate a filter coefficient weighted sum of symbols stored in the memory registers. As shown in FIG. 36A an additional delay memory register must be added to successive parallel stages. These delay registers allow for proper timing of the feedback symbol adjustments from the parallel stages.

The individual taps from each parallel delay stage $T_{i,n}$, i=0 to 10, N=0 to 7, are provided to a filter predictor 200 which provides outputs to multipliers 206 (referring to FIG. 36B, the filter predictor for the i-th stage is illustrated) which receive as second inputs thereto the individual filter coefficients $g_{i,n}$. The outputs of the multipliers 206 are provided to the summing circuit 208 which provides the filter coeficient weighted sum of the symbols stored in the memory registers. The output along line 210 therefore represents a prediction of the filter output (126 of FIG. 6) at the timing associated to the present filter coeficients $g_{i,n}$.

The output of the filter predictor 200 provided along line 210 is provided to peak reduction algorithm calculation circuit 218. In the particular implementation shown, the peak reduction algorithm calculator circuit includes a magnitude detection circuit 222 that receives the predicted filtered outputs along line 210 and detects the magnitude thereof. The detected magnitude of the predicted filtered outputs is provided to comparator 226 that also receives a predetermined limit value L and the value of the center filter tap gain $g_4$. As the case of preceding embodiments, if the predicted filtered symbol value exceeds the limit value than a switch enabling signal is provided to selector switch 230. On the other hand, if the predicted filtered symbol value is less than or equal to the limit value the switch 230 is enabled so as to provide an output which does not adjust the peak value, e.g., a zero value in the illustrated embodiment. The predicted filter outputs are also provided to algorithm processor 218 that may implement any of a number of suitable peak reduction algorithms. In the specific implementation shown which only receives as input the predicted filtered symbol values, the limit value L, and the gain applied to the center tap of the filter predictor $g_4$, a suitable algorithm implemented by that circuit may be that of equation (5). The output of algorithm processor 218 is then provided as a feedback peak reduction value $F_i$ to the other stages if selector switch 230 is enabled for such an output by comparator 226.

Each parallel branch produces a feedback symbol adjustment. These feedback adjustments are provided to each of the parallel branches so that the latest symbol values can be included in future filter predictions. The feedback to the branches can be implemented to two ways. These two ways are illustrated in FIGS. 22 and 23. FIG. 36 shows an implementation of the embodiment shown in FIG. 23. The symbol adjustment of each parallel branch is provided to all parallel branches. The feedback from lower branches is not shown in the upper branches since the feedback would occur after the last taped memory register. FIG. 36 could be modified to represent FIG. 22 if feedback of each individual branch fed back to itself and all lower branches. The embodiment of FIG. 22 is less accurate than FIG. 23 since future predictions of all branches would not be based on the most current symbol values. FIG. 23 would however provide effective peak reduction.

Those skilled in the art should appreciate that FIGS. 36A and 36B show a parallel implementation of FIG. 33 with the inclusion of additional feedback from other parallel stages. Those skilled in the art should also appreciate that all embodiments including feedback such as FIGS. 31 and 35 could be likewise modified for use in the above parallel embodiment.

Also, those skilled in the art should appreciate that the parallel implementations shown in FIGS. 22, 23, and 36A could also be produced by providing multiple taps off of each memory register in one long multi-stage shift register. Feedback corrections would then be calculated in parallel by methods shown in FIGS. 24 and 36B by properly grouping the feedback taps with respect to the corresponding filter coefficients. Parallel calculated feedback values would then be supplied back to feedback points as shown in FIG. 36A line 9.

A number of different embodiments of the present invention have been described in relation to the various figures. Nonetheless, it will be appreciated by those skilled in the art that a variety of additional embodiments are possible within the teachings of the present invention. For example, a variety of specific circuits implementing specific algorithms may be provided employing the teachings of the present invention and limitations of space prevent an exhaustive list of all the possible circuit implementations or an enumeration of all possible algorithms. A variety of other possible modifications and additional embodiments are also clearly possible and fall within the scope of the present invention. Accordingly, the described specific embodiments and implementations should not be viewed as in any sense limiting in nature and are merely illustrative of the present invention.

Also, although the illustrated peak reduction system and method of the present invention have been illustrated as implemented in a spread spectrum communication system, such as a CDMA or WCDMA cellular network, and such provides one preferred application of the present invention, it should be appreciated that other applications and environments for the peak reduction system and method of the present invention are also possible. For example, the peak reduction system and method of the present invention may also be advantageously employed in a multi-carrier cellular base station that is not necessarily a spread spectrum communication system. Accordingly, the described specific applications and environments for the peak reduction system and method of the present invention should not be viewed as in any sense limiting in nature and are merely illustrative of the present invention.

What is claimed is:

1. A spread spectrum communication system, comprising:
   a spread spectrum symbol source providing data symbols corresponding to a plurality of separate data channels combined together;
   a filter for providing a filtering operation based on a filter impulse response function; and
   a peak reduction unit coupled between said spread spectrum symbol source and said filter and receiving said data symbols from said spread spectrum symbol source, the peak reduction unit including a filter predictor which provides predicted filtered outputs using filter coefficient values corresponding to the filter impulse response function of said filter, a peak reduction calculation circuit for receiving the predicted filtered outputs and a predetermined filter output limit value and determining a peak reduction value based on the amount a predicted filtered output exceeds the limit value, and a combiner combining the peak reduction values and data symbols, the peak reduction unit providing peak adjusted symbols to the filter to be filtered and output by the communication system.

2. A spread spectrum communication system as set out in claim 1, further comprising an up sampling circuit, coupled between the peak reduction unit and the filter, for increasing the sampling rate of the data symbols prior to filtering.

3. A spread spectrum communication system as set out in claim 2, wherein the up sampled data symbols are filtered at the up sampled filter rate.

4. A spread spectrum communication system as set out in claim 1, wherein the peak reduction unit further comprises a delay circuit for delaying the data symbols so that the combiner receives the peak reduction values and the data symbols on a symbol-by-symbol basis in a time synchronized manner.

5. A spread spectrum communication system as set out in claim 2, wherein the filter predictor receives a first set of filter coefficients corresponding to samples of the filter impulse response function at the on-symbol interval and a second set of filter coefficients corresponding to samples of the filter impulse response function at the inter-symbol interval.

6. A spread spectrum communication system as set out in claim 5, wherein the peak reduction unit includes a first stage providing peak reduction based on the on-symbol timing and a second stage providing peak reduction based on the inter-symbol timing.

7. A spread spectrum communication system as set out in claim 1, wherein the combiner comprises a multiplier circuit and wherein the peak reduction value comprises a gain which when multiplied by the data symbol provides an adjusted symbol which will produce a peak reduced output signal.

8. A spread spectrum communication system as set out in claim 1, wherein the combiner comprises an addition circuit and wherein the peak reduction value comprises a value which when added to the symbol provides an adjusted symbol which will produce a peak reduced output signal.

9. A spread spectrum communication system as set out in claim 4, wherein the filter predictor includes a memory registers comprising a plurality of delay stages and wherein one or more of the delay stages comprises said delay circuit.

10. A spread spectrum communication system as set out in claim 1, wherein the filter predictor includes a memory registers comprising a plurality of delay stages wherein each said delay stage corresponds to a separate filter coefficient input.

11. A spread spectrum communication system as set out in claim 10, wherein the filter predictor includes a plurality of multipliers equal in number to the plurality of delay stages comprising said memory registers and wherein each of said multipliers receives one of said filter coefficients.

12. A spread spectrum communication system as set out in claim 11, wherein the filter predictor further comprises a summing circuit receiving the outputs of said plurality of multipliers.

13. A spread spectrum communication system as set out in claim 12, wherein there are N stages of said memory registers, N multipliers, and N filter coefficient inputs, wherein N is less than or equal to the number of filter coefficients of said filter.

14. A spread spectrum communication system as set out in claim 1, wherein said peak reduction calculation circuit comprises a magnitude detection circuit for detecting the magnitude of the input predicted filtered outputs and a comparator for comparing the magnitude of the input predicted filtered outputs to the signal output peak limit value.

15. A spread spectrum communication system as set out in claim 14, wherein the peak reduction unit further comprises a selector switch coupled to the comparator and enabling the peak reduction value to be output to the combiner when said switch is enabled by the comparator.

16. A spread spectrum communication system as set out in claim 14, wherein the peak reduction calculation circuit further comprises an algorithm processor for implementing a peak reduction algorithm based on the limit value and the predicted filtered outputs.

17. A spread spectrum communication system as set out in claim 16, wherein the peak reduction calculation circuit further comprises a subtraction circuit.

18. A spread spectrum communication system as set out in claim 16, wherein the peak reduction calculation circuit further comprises a division circuit.

19. A spread spectrum communication system as set out in claim 1, wherein the peak reduction unit further comprises a feedback loop which provides the peak reduction values to the filter predictor.

20. A spread spectrum communication system as set out in claim 19, wherein the filter predictor includes memory registers comprising a plurality of delay stages and wherein the feedback loop provides said peak reduction values to said memory registers between the delay stages.

21. A spread spectrum communication system as set out in claim 1, further comprising a digital to analog converter coupled to receive the output of the filter and an RF amplifier output of the digital to analog converter.

22. A spread spectrum communication system as set out in claim 21, further comprising a transmission antenna coupled to the output of the RF amplifier.

23. A spread spectrum communication system as set out in claim 1, wherein the spread spectrum symbol source comprises a plurality of input channels for receiving a plurality of separate digital data channels, a plurality of spreading code circuits equal in number to the number of separate digital data channels, each spreading code circuit providing a different spreading code, and a plurality of multiplier circuits for multiplying one of the spreading codes with one of the separate digital data channels and providing a plurality of spread spectrum channels.

24. A spread spectrum communication system as set out in claim 23, further comprising a spread spectrum channel combining circuit for combining the individual spread spectrum channels together to form the combined data symbols.

25. A spread spectrum communication system, comprising:
   a spread spectrum symbol source providing data symbols corresponding to a plurality of separate data channels combined together;
   an up sampling circuit for increasing the sampling rate of symbols input thereto and providing up sampled symbols;
   a filter for providing a filtering operation based on a filter impulse response function having a plurality of filter coefficients corresponding to a timing based on said increased sampling rate; and
   a peak reduction unit coupled between said spread spectrum symbol source and said filter and receiving said data symbols from said spread spectrum symbol source, the peak reduction unit including a plurality of peak reduction stages, each stage predicting the effect of the filter on the data symbols using filter coefficient values corresponding to a portion of the filter impulse response function of said filter to provide predicted filtered outputs and providing a peak reduction processing on predicted filter outputs which exceed a peak limit value, the peak reduction unit providing peak adjusted symbols after said plural stage peak reduction processing to said filter to be filtered and output by the communication system.

26. A spread spectrum communication system as set out in claim 25, wherein said plural stages of said peak reduction unit are provided in series.

27. A spread spectrum communication system as set out in claim 25, wherein said plural stages of said peak reduction unit are provided in parallel.

28. A spectrum communication system as set out in claim 25, wherein each stage of the peak reduction unit applies filter coefficients corresponding to a timing offset from the symbol rate by an integral number of up sampled timings.

29. A spread spectrum communication system as set out in claim 25, wherein each stage of the peak reduction unit comprises a filter predictor receiving filter coefficients corresponding to said portion of the filter impulse response function and providing said predicted filtered outputs, and a peak reduction calculation circuit for calculating a peak reduction value based on the predicted filtered outputs provided by the filter predictor.

30. A spread spectrum indication system as set out in claim 29, wherein each stage of the peak reduction unit further comprises a combiner for receiving the calculated peak reduction values and combining them with the input symbols.

31. A spread spectrum communication system as set out in claim 30, wherein each stage of the peak reduction unit further comprises a delay circuit for delaying the input symbols and providing the delayed symbols to the combiner so that the peak reduction values and delayed symbols are combined on a symbol-by-symbol basis at a correct timing.

32. A spread spectrum communication system as set out in claim 30, wherein said combiner comprises a multiplier.

33. A spread spectrum communication system as set out in claim 30, wherein said combiner comprises an adder.

34. A system for reducing peak signal output values, the system being adapted for use in a communication system including a filter which provides symbol filtering prior to outputting signals from said system, comprising:
   filter predictor means for receiving symbols prior to filtering by said filter and predicting the effect of said filtering on said symbols; and
   means, coupled to the filter predictor means, for adjusting the symbols which are predicted to exceed a peak limit value after being subjected to said filtering,
   wherein said filter has a predetermined impulse response function and wherein said filter predictor means includes means for receiving filter coefficients corresponding to said impulse response function at a plurality of sample points.

35. A system for adjusting symbol values as set out in claim 34, wherein said means for receiving filter coefficients receives filter coefficients at a sample timing and an inter-symbol sample timing.

36. A system for adjusting symbol values as set out in claim 34, wherein said means for receiving filter coefficients receives filter coefficients at a plurality of offset symbol sample times.

37. A system for adjusting symbol values as set out in claim 34, wherein said filter predictor means comprises a plurality of stages each stage receiving different filter coefficients representing different filter output timing.

38. A system for adjusting symbol values as set out in claim 37, wherein said stages are configured in series.

39. A system for adjusting symbol values as set out in claim 37, wherein said stages are configured in parallel.

* * * * *